US012318898B2

(12) United States Patent
Wanka et al.

(10) Patent No.: US 12,318,898 B2
(45) Date of Patent: Jun. 3, 2025

(54) LOCKING PLIERS AND OTHER GRIPPING TOOLS

(71) Applicant: 9223-1620 Quebec Inc., Farnham (CA)

(72) Inventors: Andrew Wanka, Hatley (CA); Ralph Krupkat, Montreal Nord (CA)

(73) Assignee: 9223-1620 QUEBEC INC., Farnham (CA)

( * ) Notice: Subject to any disclaimer, the term of this patent is extended or adjusted under 35 U.S.C. 154(b) by 308 days.

(21) Appl. No.: 17/807,610

(22) Filed: Jun. 17, 2022

(65) Prior Publication Data

US 2022/0402101 A1 Dec. 22, 2022

Related U.S. Application Data

(60) Provisional application No. 63/202,625, filed on Jun. 17, 2021.

(51) Int. Cl.
*B25B 7/02* (2006.01)
*B25B 7/12* (2006.01)

(52) U.S. Cl.
CPC ................ *B25B 7/02* (2013.01); *B25B 7/123* (2013.01)

(58) Field of Classification Search
CPC .. B25B 7/02; B25B 7/12; B25B 7/123; B25B 7/14; B25B 7/16; B25B 7/18;
(Continued)

(56) References Cited

U.S. PATENT DOCUMENTS 269,903 A * 1/1883 Whitehead ................ B25B 1/04 24/135 R
673,605 A * 5/1901 Jacques ..................... B25B 7/02 269/3

(Continued)

FOREIGN PATENT DOCUMENTS

CN 203591340 U 5/2014
CN 108115598 A 6/2018

(Continued)

OTHER PUBLICATIONS

Kim, Hongbong et al., "Object Recognition of One-DOF Tools by a Back-Propagation Neural Net", IEEE Transactions on Neural Networks, vol. 6, Issue 2, pp. 484-487, Mar. 1995.

(Continued)

*Primary Examiner* — Robert J Scruggs
(74) *Attorney, Agent, or Firm* — Borden Ladner Gervais; Richard A. Johnson

(57) ABSTRACT

A tool comprising an outer body with a first end and a second end, the outer body defining a longitudinal recess therein and having at least two connector link pivot points at the first end thereof, an inner body slidably received within the longitudinal recess of the outer body and having a core head extending out of the first end of the outer body, at least two jaws, each jaw having an inner pivot point and an outer pivot point, wherein the inner pivot point of each jaw pivotally connected to a corresponding core head pivot point on the core head, a connector link for each jaw, each connector link having a first end pivotally connected to the outer pivot point of the jaw and a second end pivotally connected to a corresponding connector link pivot point on the first end of the outer body, and an actuating assembly for moving the inner body relative to the outer body, whereby movement of the core head toward the outer body causes the jaws to move
(Continued)

toward each other, and movement of the core head away from the outer body causes the jaws to move away from each other.

8 Claims, 19 Drawing Sheets

(58) Field of Classification Search
CPC ......... B25B 13/10; B25B 13/12; B25B 13/20; B25B 13/28; B25B 13/34; B25B 13/461; B25B 13/48; B25B 5/06; B25B 5/12; B25B 5/14; B25B 5/16; B25B 5/163
See application file for complete search history.

(56) References Cited

U.S. PATENT DOCUMENTS

| | | | | | |
|---|---|---|---|---|---|
| 2,590,261 | A * | 3/1952 | Matthysse | B25B 7/02 72/409.01 |
| 3,144,947 | A * | 8/1964 | Pittwood | B25J 15/10 414/730 |
| 4,028,971 | A * | 6/1977 | Budrose | B25B 7/12 30/191 |
| 4,262,410 | A * | 4/1981 | Roberts | B25B 27/14 81/57.2 |
| 4,438,668 | A * | 3/1984 | Solomon | B25B 7/12 81/352 |
| 4,651,598 | A * | 3/1987 | Warheit | B25B 7/12 81/394 |
| 6,488,287 | B2 | 12/2002 | Gaddis et al. | |
| 7,214,060 | B2 | 5/2007 | Maître | |
| 8,925,985 | B2 | 1/2015 | Wyles | |
| 9,463,555 | B1 * | 10/2016 | Hile | B25B 9/00 |
| 9,861,272 | B2 | 1/2018 | Pell et al. | |
| 2019/0343523 | A1 | 11/2019 | Gordon et al. | |
| 2021/0060736 | A1 * | 3/2021 | Solomon | B25B 7/123 |

FOREIGN PATENT DOCUMENTS

| | | | |
|---|---|---|---|
| CN | 209174814 | U | 7/2019 |
| CN | 110338904 | * | 10/2019 |
| DE | 102015008872 | A1 | 1/2017 |
| FR | 2528750 | A1 | 12/1983 |
| GB | 969906 | A | 9/1964 |
| WO | 2017/035475 | A1 | 3/2017 |

OTHER PUBLICATIONS

Three Jaw Plier (Heavy), US Orthodontic Products, Inc., downloaded from https://usortho.com/shop/product/three-jaw-plier-heavy/ on Sep. 7, 2022.

* cited by examiner

100K

LOCKING PLIERS AND OTHER GRIPPING TOOLS

CROSS REFERENCE TO RELATED APPLICATION

This application claims the benefit of priority of U.S. Provisional Patent Application No. 63/202,625 filed Jun. 17, 2021, which is hereby incorporated herein by reference in its entirety.

TECHNICAL FIELD

The present disclosure relates to tools for gripping objects, such as locking pliers. Particular embodiments relate to locking pliers with a plurality of jaws adapted for gripping cylindrical objects from an axial direction.

BACKGROUND

Tradesmen, mechanics, technicians, and other individuals use a variety of manual hand tools on a daily basis. A very commonly used manual hand tool is locking pliers which is routinely referred to by its tradename Vise-Grips™. Since the original Peterson design (approx. 1934-1936), there have been a number of improvements in the functionality, ease of use, and versatility of Vise-Grips and similar tools. The last major modification by Peterson to the basic mechanism was the addition of a lock release lever, which was patented in 1957.

Such conventional tool designs are well suited for clamping onto a work-piece that fits into the plier's jaws at 90 degrees (perpendicular) to the plier's body. However, quite often the job requires one to grab and lock onto a work-piece axially (parallel to the plier body with the work-piece protruding outwards from the jaw tips). The need for axial gripping can be understood if one imagines holding a bolt or a shaft and trying to grind, cut, or drill. The action of removing a damaged fastener in a limited space or trying to align and insert an uncooperative pin into an object can also require axial gripping. However, when using conventional locking pliers to hold a workpiece in an axial position, when force is applied to the clamped workpiece, the workpiece tends to swing in a perpendicular direction relative to the jaw clamping force. This undesired workpiece movement is even more pronounced when the work-piece is cylindrical in shape. When conventional tools are used for axial gripping, they can damage not only the work-pieces but also the tools themselves, and possibly also result in personal injury. Such risks are often ignored, simply because there are no better tools available for the job at hand.

The inventors have determined a need for improved tools for gripping workpieces axially.

SUMMARY

One aspect of the present disclosure provides a tool comprising an outer body with a first end and a second end, the outer body defining a longitudinal recess therein and having at least two connector link pivot points at the first end thereof, an inner body slidably received within the longitudinal recess of the outer body and having a core head extending out of the first end of the outer body, at least two jaws, each jaw having an inner pivot point and an outer pivot point, wherein the inner pivot point of each jaw pivotally connected to a corresponding core head pivot point on the core head, a connector link for each jaw, each connector link having a first end pivotally connected to the outer pivot point of the jaw and a second end pivotally connected to a corresponding connector link pivot point on the first end of the outer body, and an actuating assembly for moving the inner body relative to the outer body, whereby movement of the core head toward the outer body causes the jaws to move toward each other, and movement of the core head away from the outer body causes the jaws to move away from each other.

In some embodiments, the tool further comprises a compression spring placed within the longitudinal enclosure between the inner body and the second end of the outer body and an adjustment screw threadedly received the inner body and extending out from the second end of the outer body, and the actuating assembly comprises a handle assembly comprising a lever arm and a lock bar, each having a first end an a second end, wherein the lever arm has an intermediate pivot point between the first end and the second end thereof, with the first end of the lever arm connected to a handle pivot point on the outer body, the first end of the lock bar connected to the intermediate pivot point on the lever arm, and the second end of the lock bar configured to be received within a longitudinal slot in the inner body to engage a first end of the adjustment screw, whereby movement of the second end of the lever arm toward the second end of the outer body causes the core head to move toward the outer body and the jaws to move toward each other, and movement of the second end of the lever arm away from the second end of the outer body causes the core head to move away from the outer body and the jaws to move away from each other.

In some embodiments, the actuating assembly comprises first and second handle members pivotally connected to the inner body at first and second handle pivot points, and having angled portions extending forward from the handle pivot points in a crossing arrangement, and first and second handle connector links connected to corresponding handle pivot points on the outer body, whereby moving the first handle member toward the second handle member moves the core head toward the outer body.

In some embodiments, the actuating assembly comprises a robotic actuator.

In some embodiments, the tool comprises three, four, five, or more jaws.

In some embodiments, all of the jaws are pivotally connected to the core head and connector links by rivets.

In some embodiments, at least two of the jaws are pivotally connected to the core head and connector links by removable fasteners.

In some embodiments, at least one of the connector links comprises an adjustable length link.

Further aspects of the present disclosure and details of example embodiments are set forth below.

DRAWINGS

The following figures set forth embodiments in which like reference numerals denote like parts. Embodiments are illustrated by way of example and not by way of limitation in the accompanying figures.

FIG. 10 shows a locking pliers with four jaws, wherein two of the jaws have adjustable links, according to one embodiment of the present disclosure.

DETAILED DESCRIPTION

Figure 1:
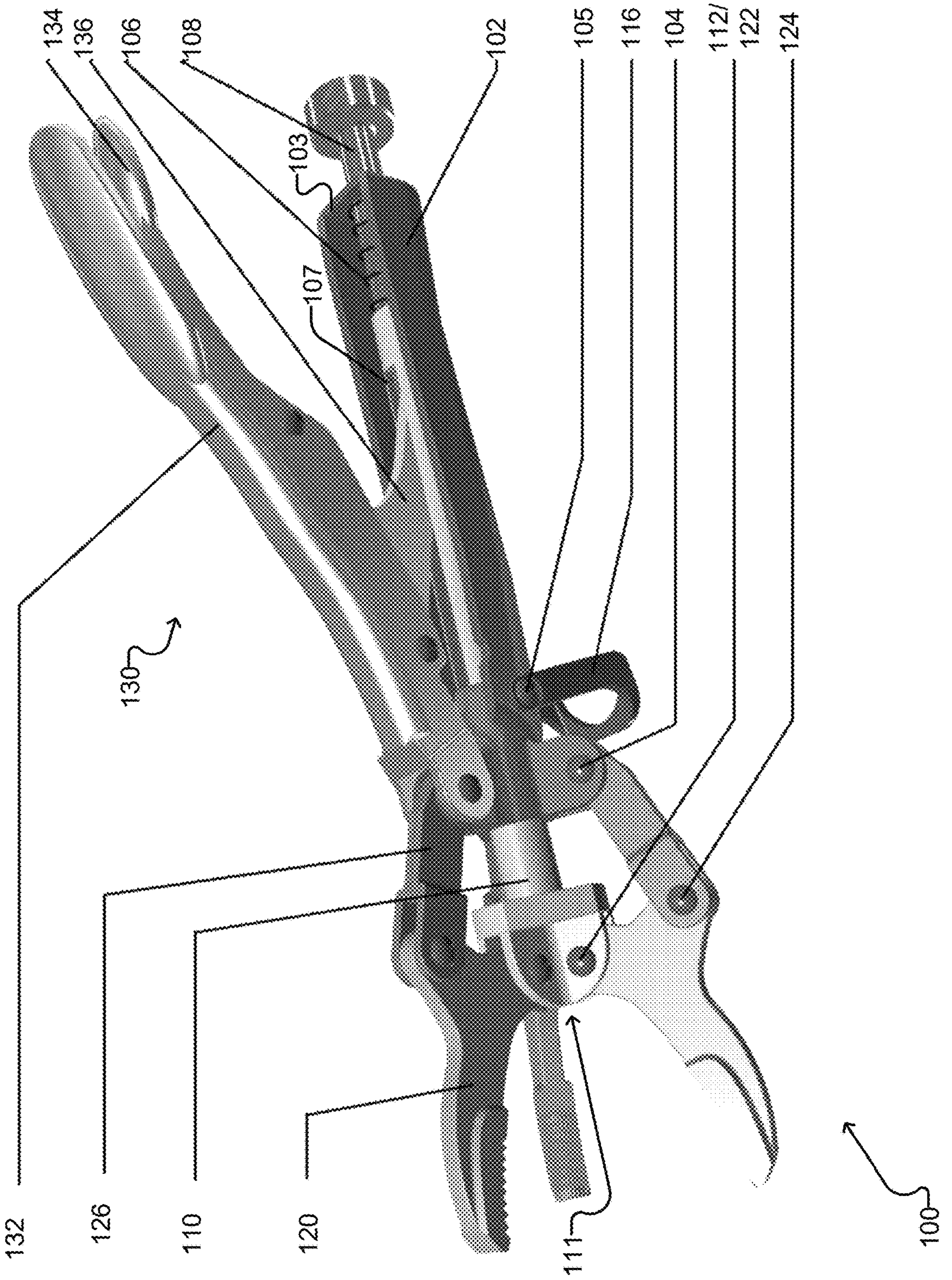
FIG. 1 shows a locking pliers with three jaws according to one embodiment of the present disclosure.

The following describes various examples of tools such as locking and non-locking pliers particularly suited for engaging workpieces such as pipes, bolts, or other cylindrical objects from an axial direction (parallel to the plier body with the workpiece protruding outwards from the jaw tips). As described below, tools according to embodiments of the present disclosure may also be utilized for engaging a variety of other types of workpieces, and engaging workpieces in other ways.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

FIGS. 1 to 6 show details of an example three-jawed locking pliers 100 according to one embodiment of the present disclosure. The pliers 100 comprise an outer body 102 with an inner body 110 slidably received therein. The outer body 102 has a plurality (three in the illustrated example) of connector link pivot points 104 at a first or “forward” end thereof. The first end of the inner body 110 extends out from the first end of the outer body 102, and has a core head 111 thereon defining a plurality (three in the illustrated example) of core head pivot points 112. The inner body 110 is retained in the outer body 102, and their relative motion is constrained, by a slot pin 105 extending laterally through the outer body 102 which is received in a core slot 115 (see FIG. 4) through the inner body 110, such that the length of the core slot 115 determines the range of relative longitudinal motion between the outer body 102 and inner body 110. As discussed below, the relative movement of the inner body 110 with respect to the outer body 102 is constrained such that the core head 111 will never contact the first end of the outer body 102.

A jaw 120 is connected to each core head pivot point 112. Each jaw 120 has an inner pivot point 122, which is pivotally connected (e.g. by a rivet) to the core head pivot point 112, and an outer pivot point 124, which is pivotally connected (e.g. by a rivet) to the first end of a connector link 126. The second end of the connector link 126 is pivotally connected (e.g. by a rivet) to a corresponding one of the jaw pivot points 104 on the outer body 102. The jaw outer pivot point 124 acts as a semi-stationary pivot point around which the jaw 106 rotates as it is activated to grab or release a work-piece, and the connector link 126 compensates for the arc of movement of the jaw outer pivot point 124 when the jaw inner pivot point 122 moves “forwards” (i.e. away from the outer body 102) or “backwards” (i.e. toward the outer body 102) when triggered by movement of the core head 111. Thus the position of all the jaws 120 is controlled by the movement of the inner body 110 in and out of the outer body 102, whereby movement of the core head 111 towards the outer body 102 causes the jaws 120 to move towards each other, and movement of the core head 111 away from the outer body 102 causes the jaws 120 to move away from each other.

An adjustment screw 108 is threadedly received in the second end of the inner body 110, and extends out of the second end of the outer body 102 through an opening in an end wall 103. A compression spring 106 is positioned over the adjustment screw 108 between the end wall 103 and the inner body 110 for biasing the inner body 110 "forwardly" (i.e. to extend the core head 111 away from the first end of the outer body 102, urging the jaws 120 open). The inner body 110 has a longitudinal slot 107 therein for receiving a lock bar 136 of a handle assembly 130, and the second end of the lock bar 136 abuts the first end of the adjustment screw 108. Accordingly, by adjusting the adjustment screw 108, the user can adjust the relative longitudinal position of the inner body 110 with respect to the outer body, and thus the relative spacing between the jaws 120. As noted above, the relative movement of the inner body 110 with respect to the outer body 102 is constrained such that the core head 111 will never contact the first end of the outer body 102, and consequently when the tool is in the closed position and the adjustment screw 108 is adjusted to minimize jaw spacing (jaws adjusted for less than minimum size workpiece), all clamping pressure will be on the jaw tips against each other when there is no workpiece in the jaws. This arrangement also ensures the tool operation will continue be the same when the jaw tips start to wear with time.

The handle assembly 130 comprises a lever arm 132 pivotally attached (e.g. by a rivet) at a first end thereof to a suitable attachment point on the outer body 102. In the illustrated example, the lever arm 132 is attached to one of the connector link pivot points 104 on the outer body 102, but the lever arm 132 could be attached to other locations on the outer body 102 in different embodiments. The lock bar 136 is pivotally attached (e.g. by a rivet) to the lever arm 132 near the first end of the lever arm 132, and a release arm 134 is pivotally attached (e.g. by a rivet) to the lever arm 132 rearward of the lock bar 136, with the first end of the release arm 134 positioned between the lever arm 132 and the lock bar 136 and the second end of the release arm 134 positioned next to the second end of the lever arm 132. In some embodiments, a small spring 133 (see FIG. 1D) is provided between the lever arm 132 and release arm 134. In some embodiments, small spacers are provided on either side of the lock bar 136 to ensure that the lock bar 136 is centered in the inside cavity of the lever arm 132. These spacers may or may not be required in all embodiments.

Figure 5:
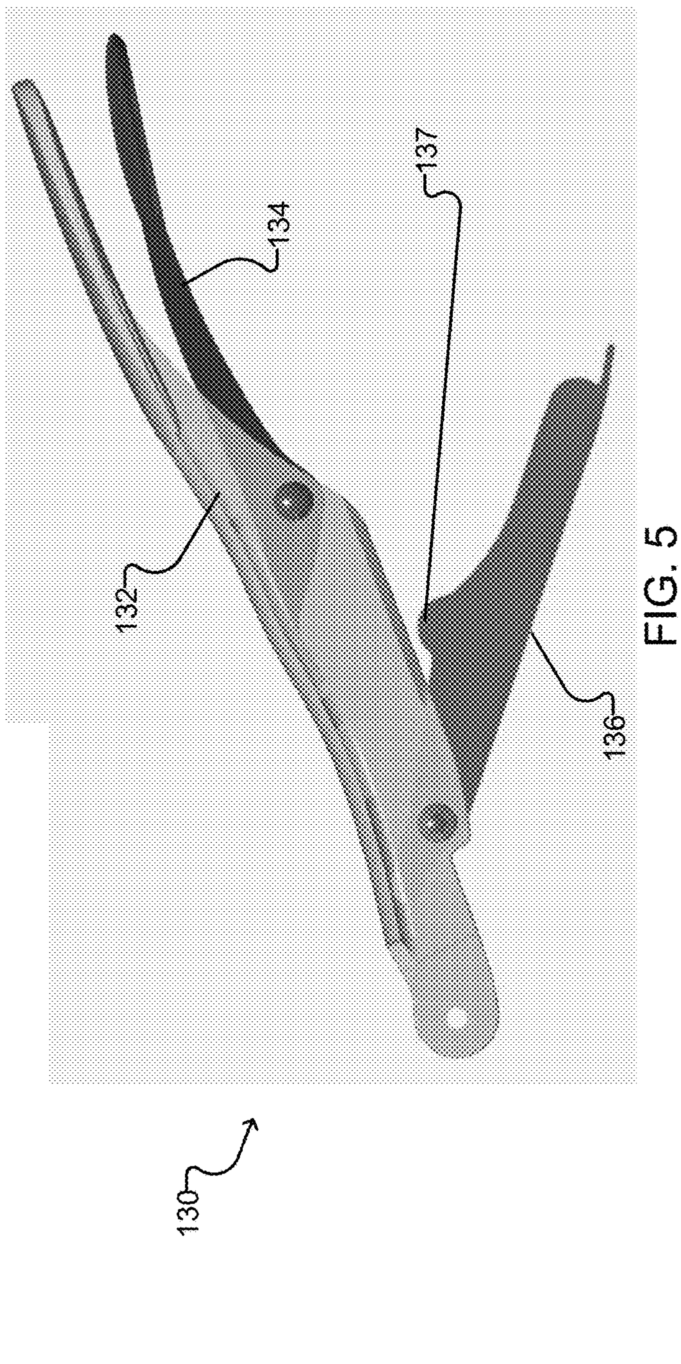
FIG. 5 shows the handle assembly of the locking pliers of FIG. 1 in isolation.
Figure 6:
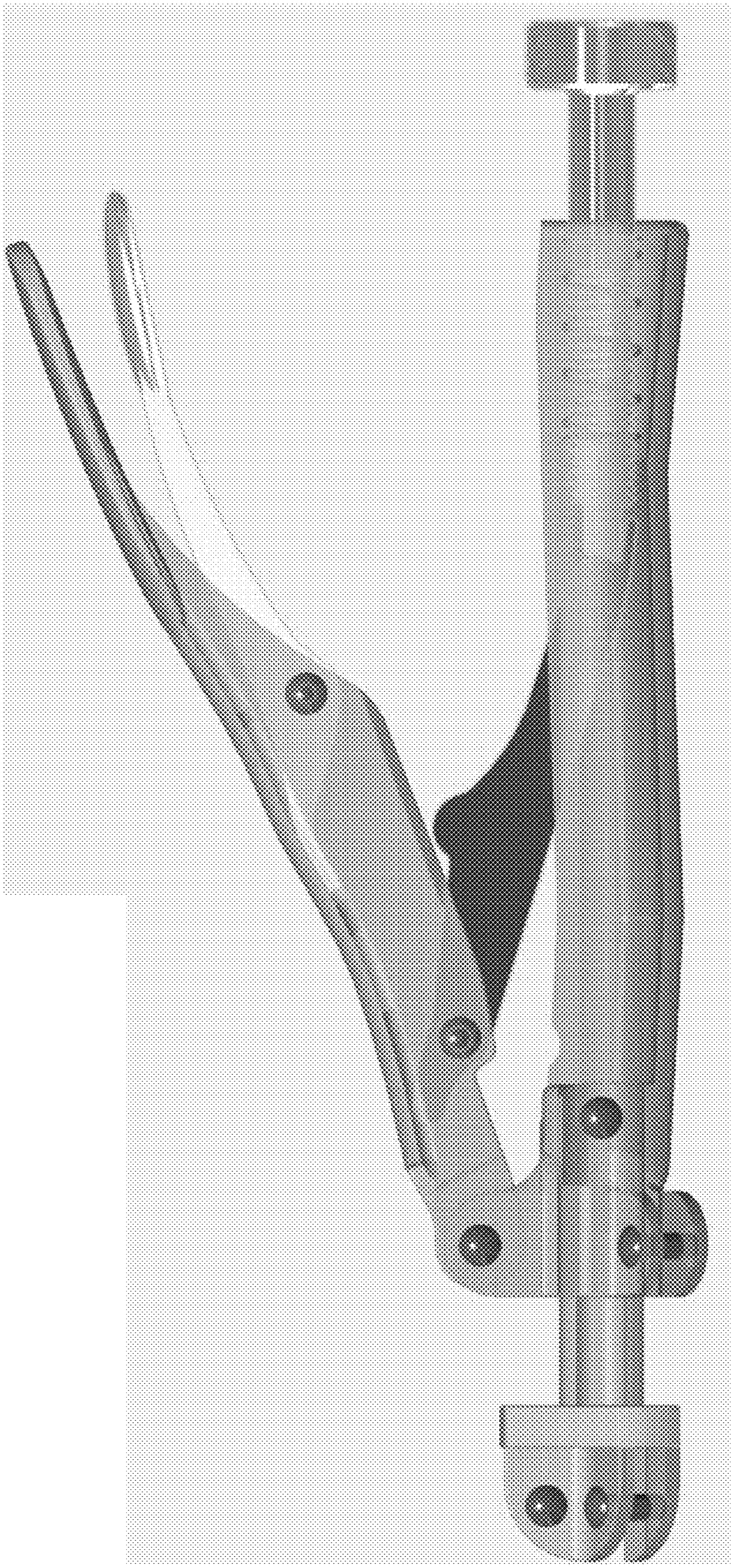
FIG. 6 shows the interaction between the handle assembly and the outer and inner bodies of the locking pliers of FIG. 1.

As best seen in FIGS. 5 and 6, the first end of the lock bar 136 extends slightly past the pivot point where the lock bar 136 is attached to the lever arm 132 so as to serve as a stop when the first end of the lock bar 136 contacts the lever arm 132, limiting the opening angle therebetween. The lock bar 136 has a rounded bump thereon shaped such that when the lever arm 132/release arm 134 contacts the bump the user may continue to continue to exert force on the lever arm 132 to place the tool 100 into an "overlock" state wherein the jaws remain closed against the opening force applied by the spring 106 even when the user is not applying any force to the lever arm 132. The adjustment screw 108 has a shoulder machined on the first end, such that when installed in the internal thread of the inner body 110, there is a tubular empty space between the inner diameter of the internal thread and the outer diameter of the first end of the screw 108, to capture the small tail on the second end of the lock bar 136 (best seen in FIGS. 5 and 6), preventing the lock bar 136 from lifting out of the longitudinal slot 107 of the inner body 110. The lever arm 132 has a limited opening angle in relation to the outer body 102 when the tool is in a "fully open" position. This opening angle is determined by the combination of length of the first end of the lock bar which extends past its pivot point attachment to the lever arm 132, the second end of the lock bar 136 which is secured in the tubular space formed by the first end of the adjustment screw 108. This limiting of the opening angle of the handle has both functional and ergonomic advantages.

The release arm 134 and lock bar 136 may, for example, have the same basic design and functionality as corresponding components of conventional locking pliers. Similar to conventional locking plier mechanisms, pressing the second end of the release arm 134 toward the second end of the lever arm 132 causes the first end of the release arm 134 to push on the bump of the lock bar 136 to help break and release the overlock pressure between the lever arm 132 and the lock bar 136 when the tool is locked onto a workpiece and the mechanism is in the overlock state.

Unlike conventional locking plier mechanisms, the relationship between the outer body 102, the inner body 110, the core head 111 and the compression spring 106 of tool 100 are configured such that the handle/lock bar assembly can remain in the overlock state without actually having a workpiece clamped in the jaws 120. Unlike conventional locking pliers, the spring 106 applies enough pressure on the overlock mechanism to keep the overlock function engaged by default. This feature allows tool 100, and similarly constructed tools according to other embodiments, to be used for various "third hand" operations.

Many jobs require a workpiece to be held in place to allow the user to use both of their hands. Conventionally, bench vises have been used but they are often not the right solution. Some other tools called "third hands" are available which can be used to hold workpieces, but such solutions requires one to own or possess a separate tool to hold the workpiece in place. However, tools of the type disclosed herein allow a user to keep the overlock state engaged thereby providing the functionality of a third hand tool. The adjustment screw 108 allows the user to grab and hold any suitable workpiece with a reasonable holding force. It is pertinent to note that the holding force does not compare to the clamping power available when the handle assembly 130 is used to hold the workpiece, but the holding force is more than sufficient to grab workpieces for most third hand purposes.

In some embodiments, a bench stand 116 can be added to provide the user with another option to hold the workpiece in place on a surface. The stand 116 may optionally have a fold-down mechanism to allow the user to stow it inside when not being used. For example, in the illustrated example, the stand is pivotally attached to the outer body 102 by the slot pin 105.

Figure 2:
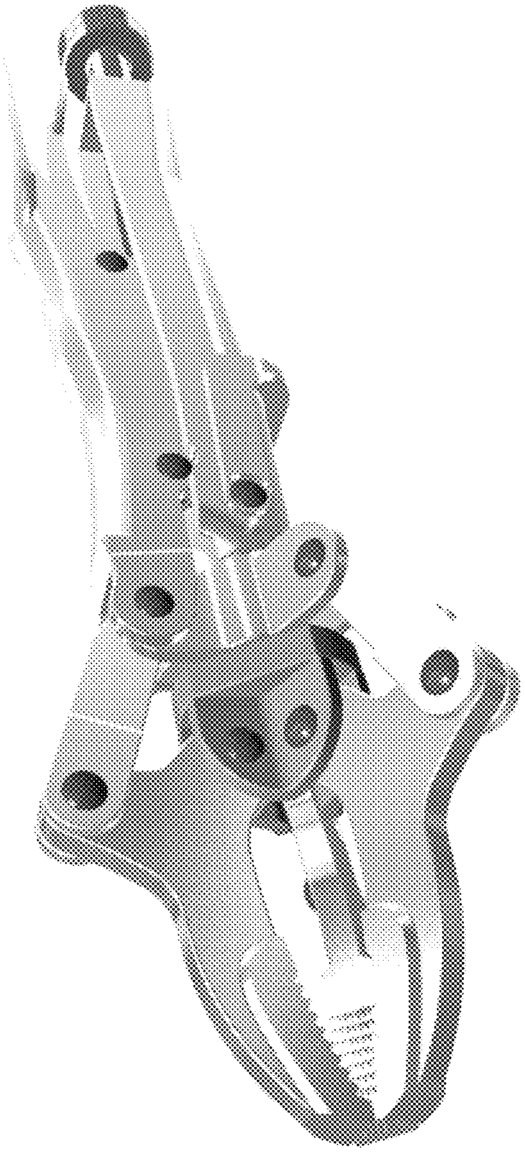
FIG. 2 shows the locking pliers of FIG. 1 in a fully closed position.
Figure 3:
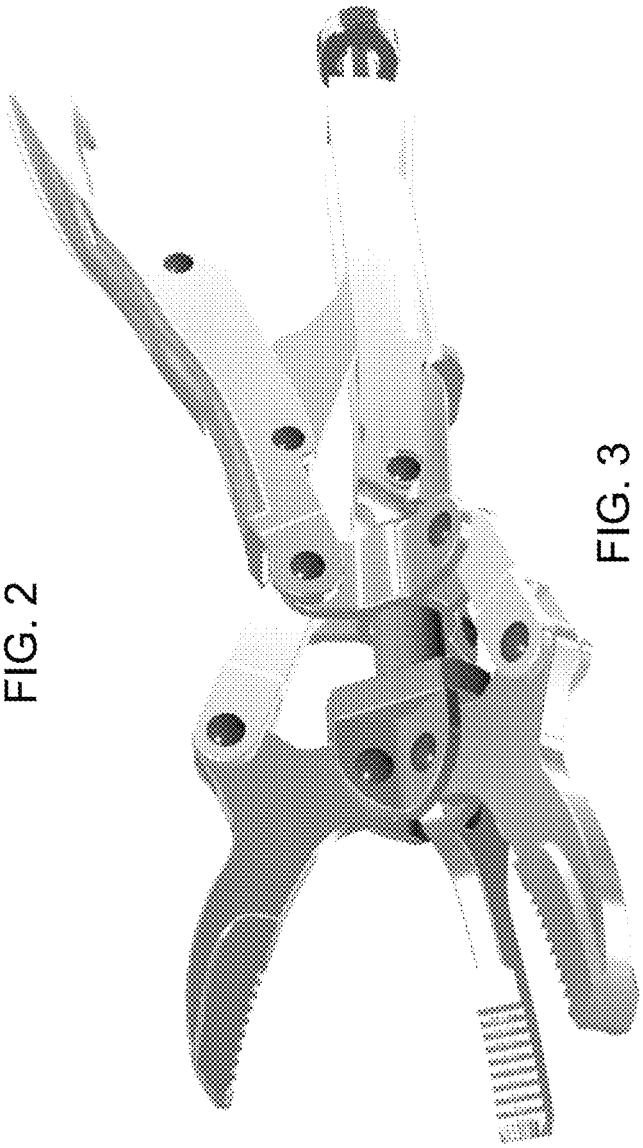
FIG. 3 shows the locking pliers of FIG. 1 in a fully open position.
Figure 4:
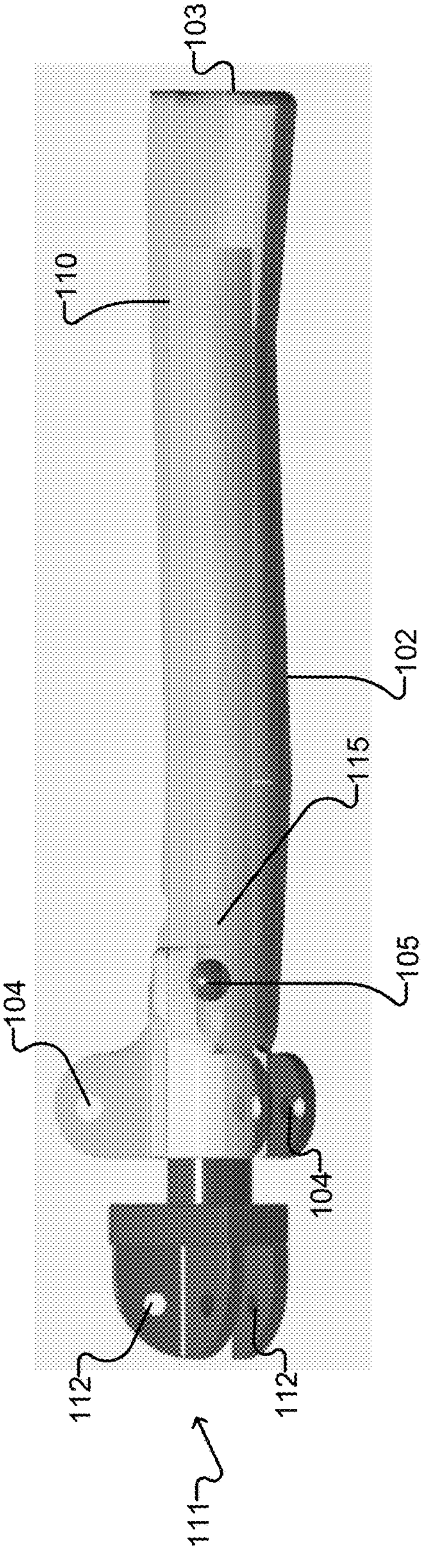
FIG. 4 shows the outer and inner bodies of the locking pliers of FIG. 1 in isolation.

As noted above, locking pliers 100 of the type disclosed herein are particularly suited for gripping workpieces axially. Because the tool's primary function is to hold workpieces axially, users can be expected to apply rotational torque to the tool in order to apply torque to the work-piece. For this reason, in some embodiments the handle assembly 130 is designed to partially engage into the outer body 102 when the tool is in the closed and locked position. For example, as best seen in FIG. 2, the edges of the lever arm 132 are sized to fit just inside the edges of the outer body 102 and around the inner body 110. This interlocking engagement greatly reduces undue stress on various tool pivot rivet points and other components.

Figure 1A:
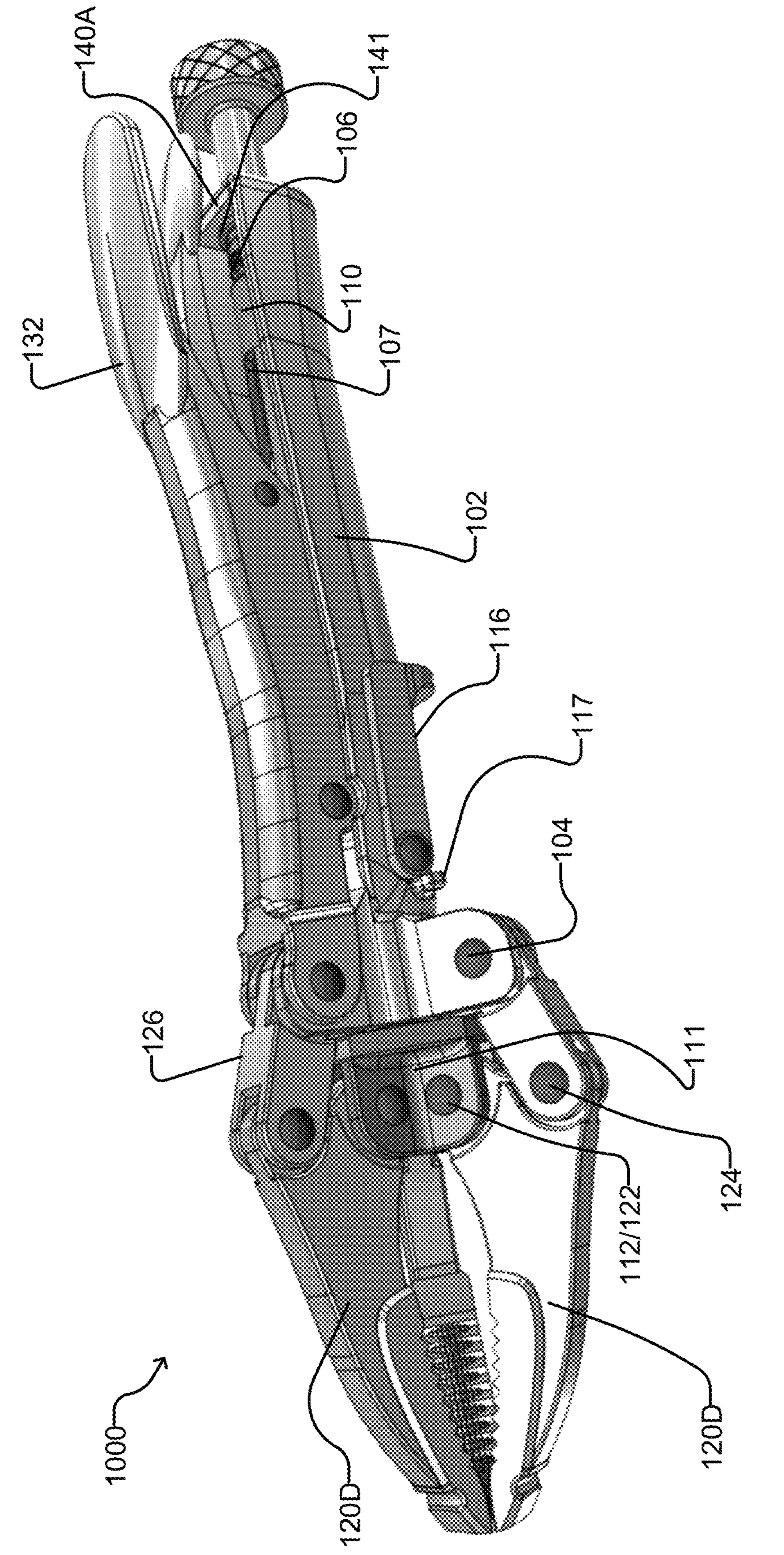
FIG. 1A shows a locking pliers with three jaws according to another embodiment of the present disclosure.
Figure 1B:
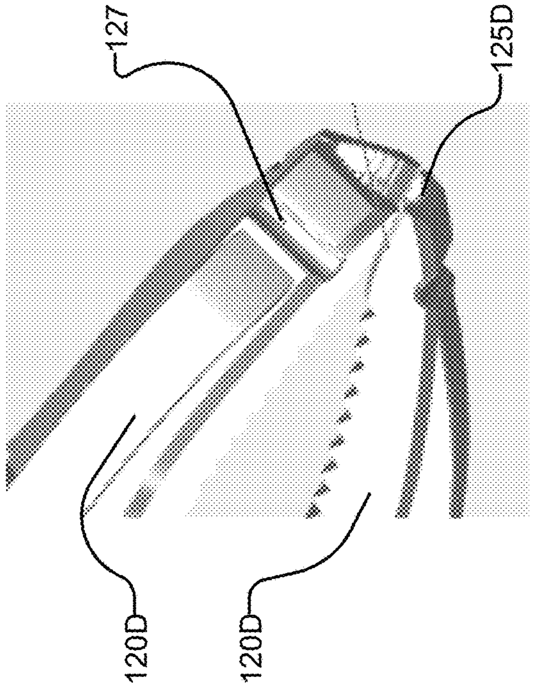
FIG. 1B is an enlarged view of the jaws of the locking pliers of FIG. 1A.
Figure 1C:
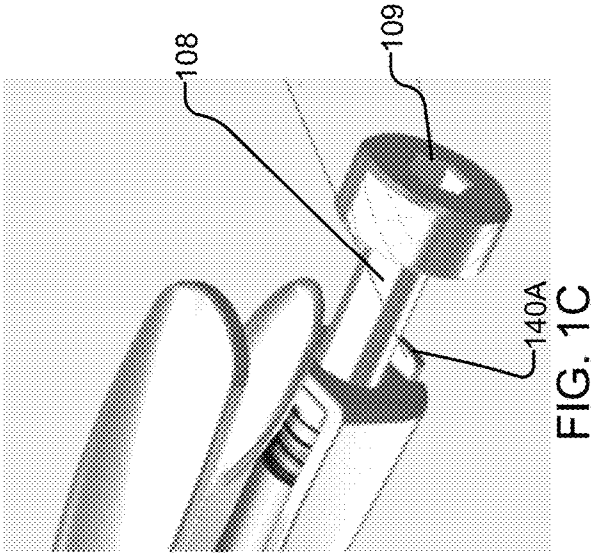
FIG. 1D shows a rear end view of the locking pliers of FIG. 1A.

FIG. 1A shows another example three-jawed locking pliers 1000 according to another embodiment of the present disclosure. The pliers 1000 are substantially similar to pliers 100 shown in FIG. 1, and as such the construction and operation of pliers 1000 will not be described in detail, other than to highlight certain features of pliers 1000 that differ from pliers 100. For example, pliers 1000 include a pair of stops 117 on the outer surface of the body 102 to limit forward rotation of the stand 116. The connector links 126 of pliers 1000 are also shorter, thicker and stronger than in pliers 100, and similarly the jaws 120D of pliers have thicker bodies than jaws 120. As best seen in FIG. 1B, each jaw 120D has a "compound-curved" gripping surface 125D on an inner surface thereof, and a compound curve and groove 127 on the outer surface thereof. The compound-curved gripping surface 125D (which similar to surface 125C described below with reference to FIG. 11B) includes a first gripping portion along most of its length with lateral serrations, and a second gripping portion with a curved inner surface and longitudinal serrations at the tip of the jaw 120D, providing for stable outer-diameter-gripping of a wide range of workpieces with differing diameters. The grooves 127 on the outer surfaces of jaws 120D allow pliers 1000 to also be used for inner-diameter-gripping for a wide range of diameters.

Figure 10:
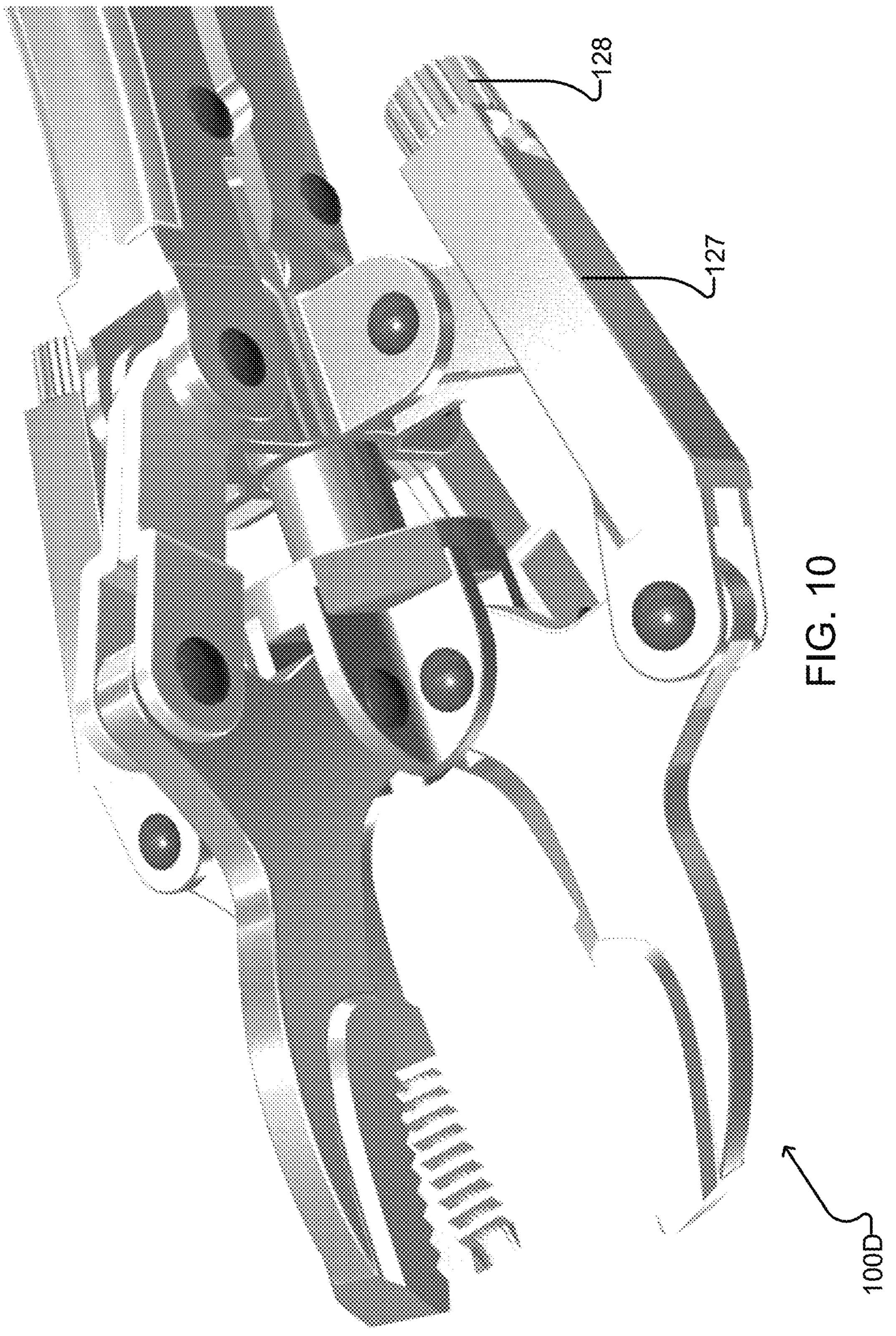
FIG. 10 is an enlarged view of a rear portion of the locking pliers of FIG. 1A.
Figure 14:
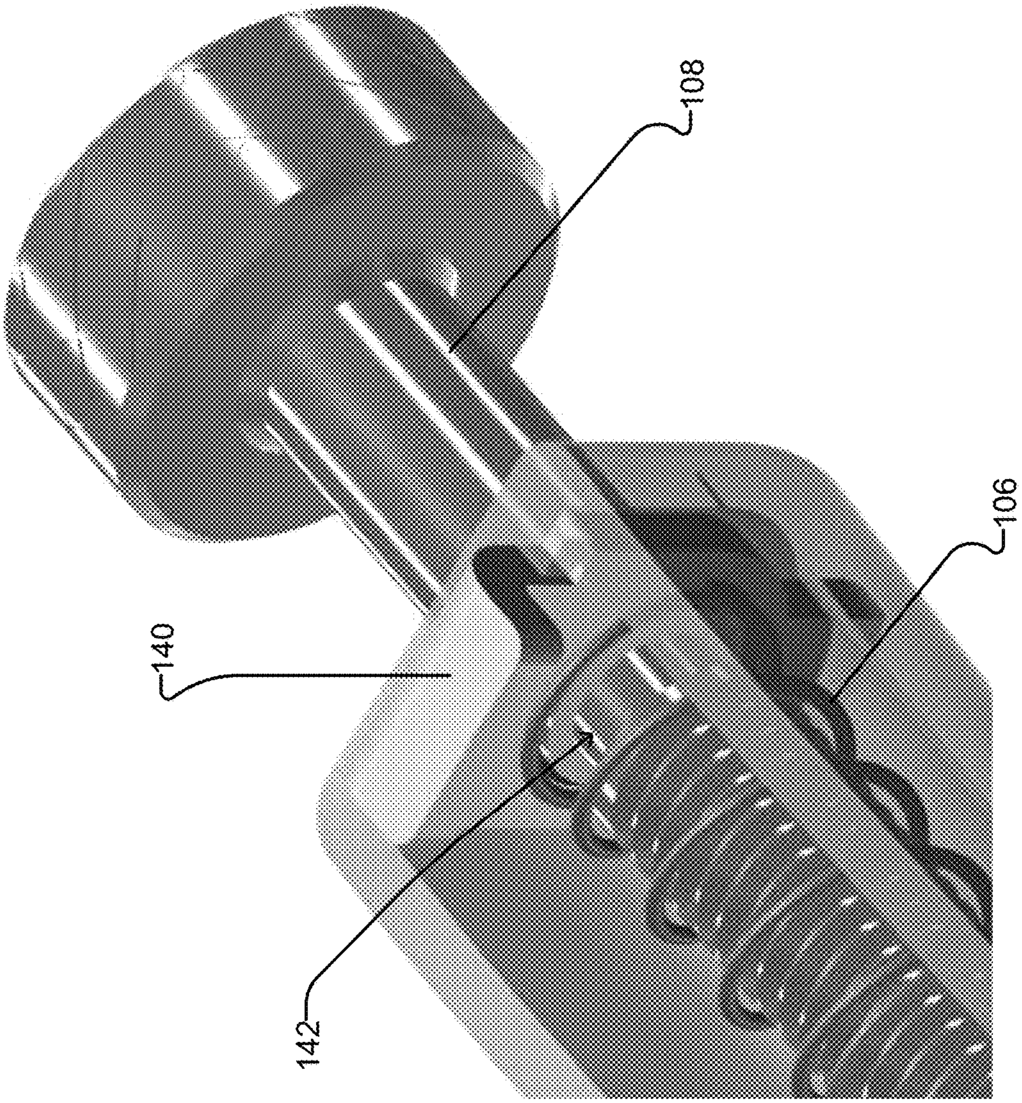
FIG. 14 shows a portion of a locking pliers with an adjustment locking plate according to one embodiment of the present disclosure.
Figure 15A:
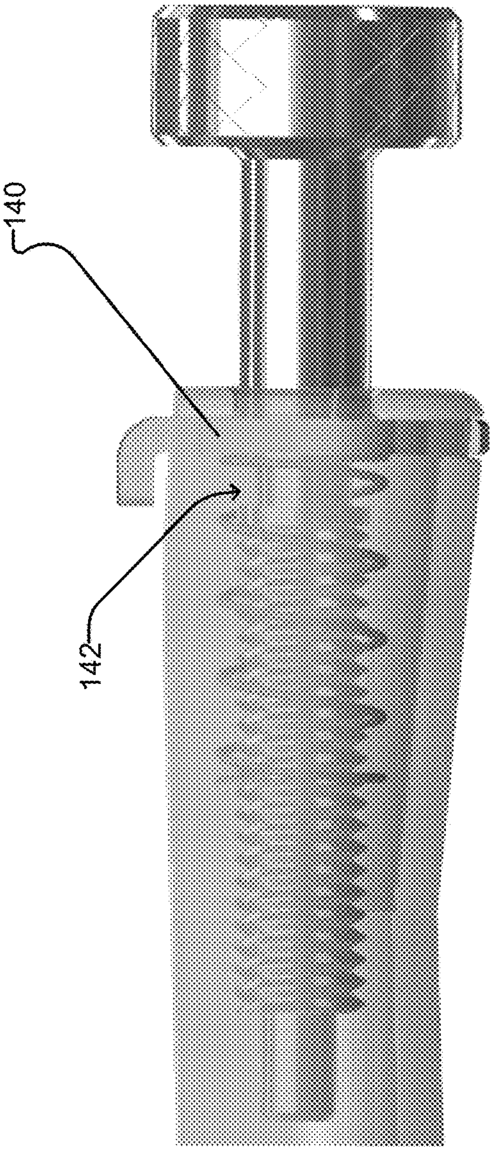
FIG. 15A shows the locking pliers of FIG. 14 with the adjustment locking plate in an unlocked position.
Figure 15B:
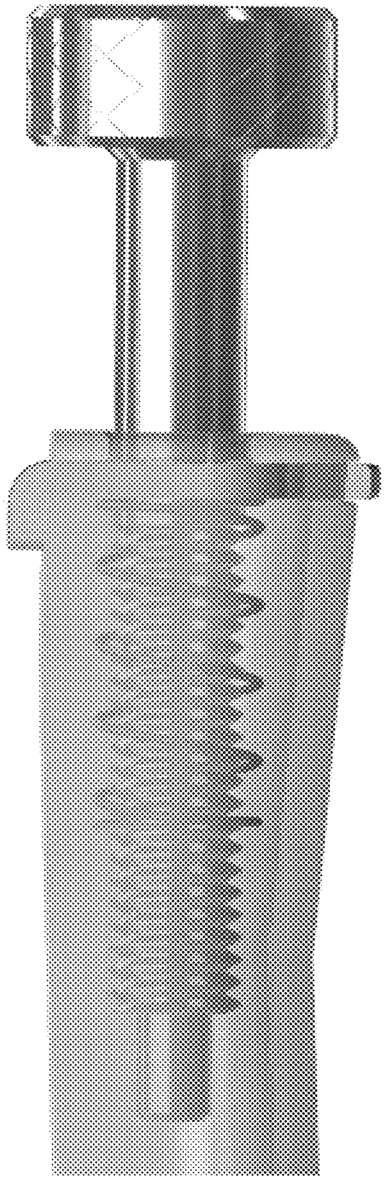
FIG. 15B shows the locking pliers of FIG. 14 with the adjustment locking plate in a locked position.

As best seen in FIG. 10, pliers 1000 include a locking plate 140A which is similar to and functions in substantially the same way as locking plate 140 described below with reference to FIGS. 14, 15A and 15B, except that locking plate 140A has a tab extending out of the bottom of the outer body 102 that a user can use to engage locking plate 140A with a groove in the adjustment screw 108. Also the adjustment screw 108 has a hexagonal key slot 109 formed in the rear end thereof. As best seen in FIG. 1A, pliers 100 also include a bushing 141 at the rear end of spring 106 for improved interaction between the locking mechanism for the adjustment screw.

Figure 1D:
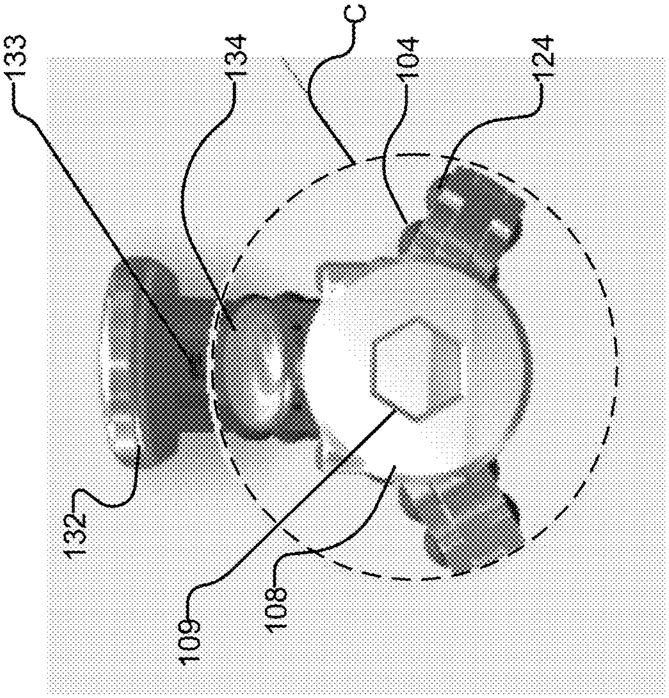

With reference to FIGS. 1A and 1D, the construction of the links 126 and the relative positions of the pivot points 104, 112/122 and 124 of pliers 1000 have been adjusted (in comparison to pliers 100 to maximize rotational contact areas, increase load bearing wall thicknesses, and also to minimize the space needed for operation of the clamping mechanism. For example, circle C in FIG. 1D illustrates how much clearance would be needed for the linkage and jaw head area of pliers 1000 of FIG. 1A. Also visible in FIG. 1D is a spring 133 between the lever arm 132 and release arm 134 to provide improved operation and user experience when using pliers 1000.

Figure 7:
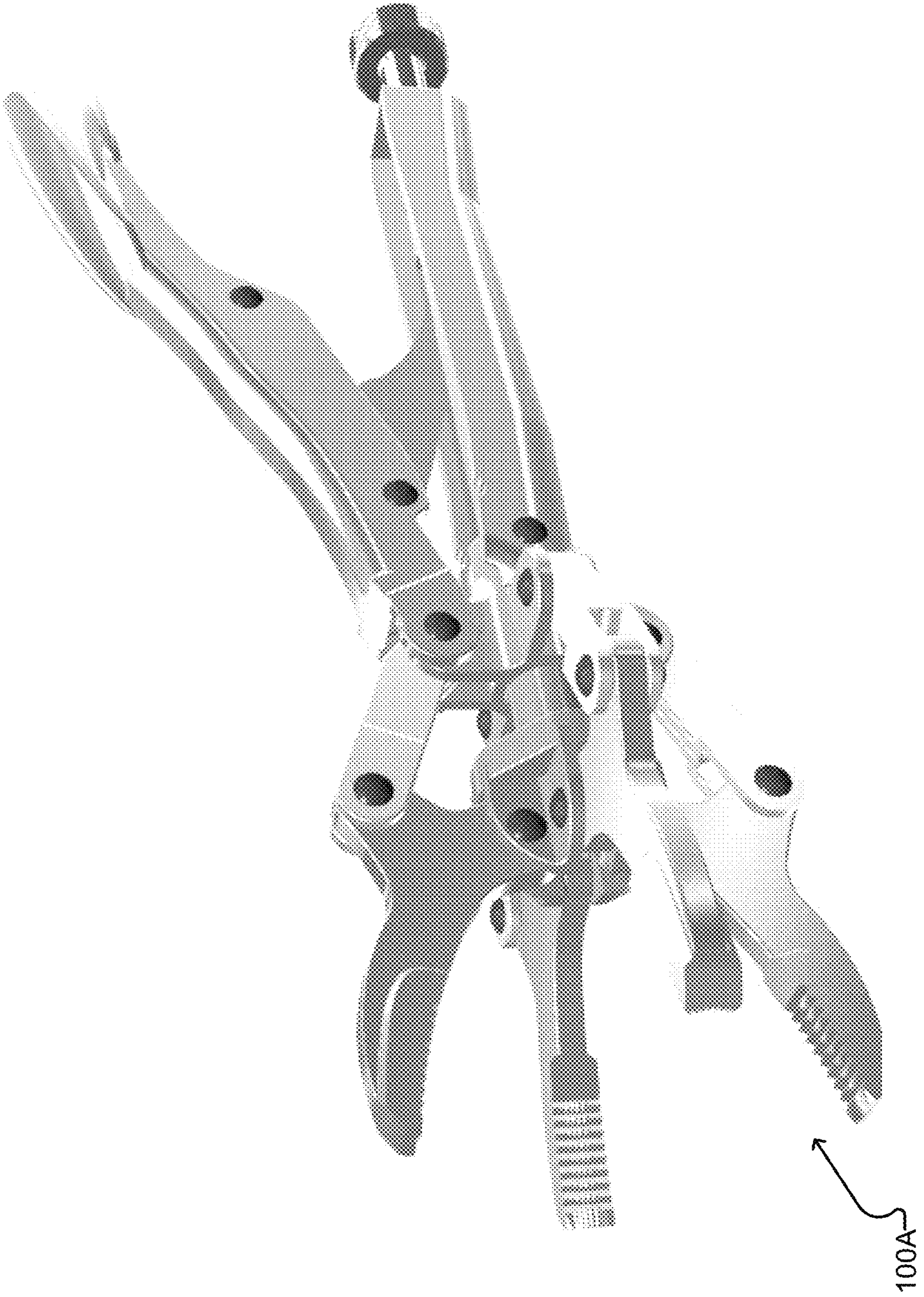
FIG. 7 shows a locking pliers with four jaws according to one embodiment of the present disclosure.
Figure 8:
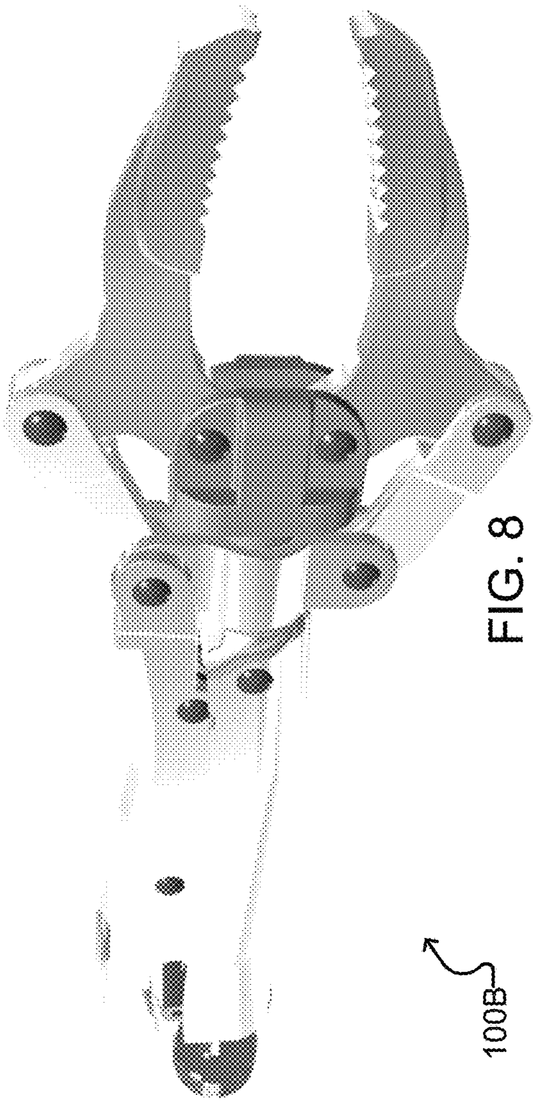
FIG. 8 shows a locking pliers with two jaws according to one embodiment of the present disclosure.
Figure 9:
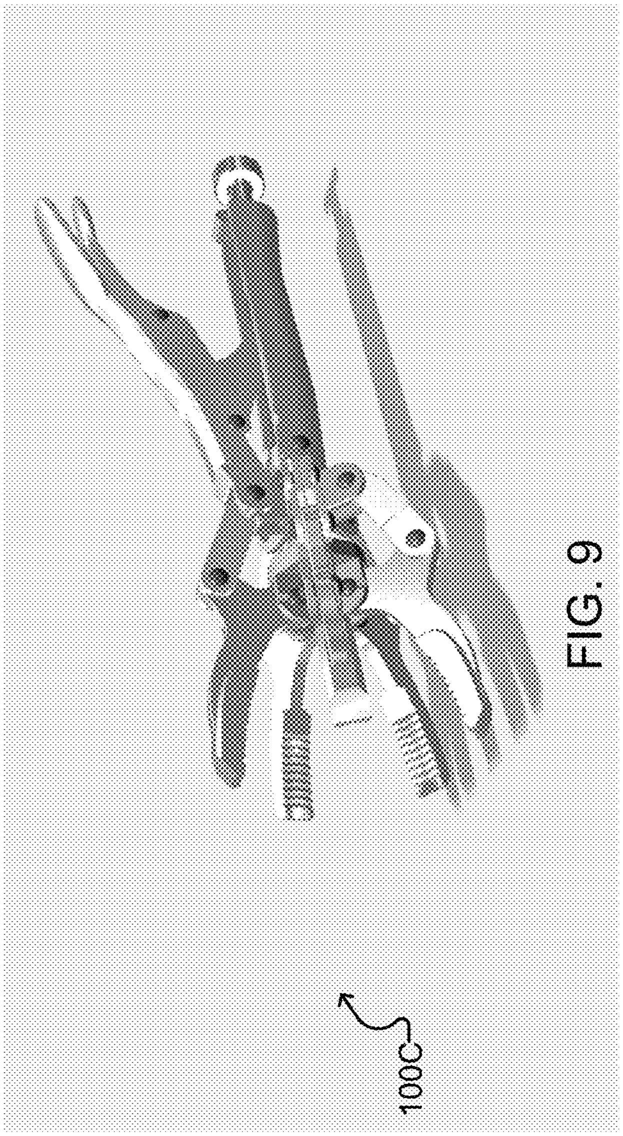
FIG. 9 shows a locking pliers with five jaws according to one embodiment of the present disclosure.

In the example pliers 100 and 1000 shown in FIGS. 1-6 and FIGS. 1A-1D the tools are equipped with three jaws. However, in other implementations, tools according to other embodiments of the present disclosure may be equipped with different numbers of jaws. For example, FIG. 7 shows a locking pliers 100A with four jaws according to one embodiment of the present disclosure, FIG. 8 shows a locking pliers 100B with two jaws according to one embodiment of the present disclosure, and FIG. 9 shows a locking pliers 100C with two jaws according to one embodiment of the present disclosure. As one of skill in the art will appreciate, other than the shape of the core head 111 and the configuration of the jaw pivot points 104 being adapted to receive a different number of jaws, pliers 100A, 100B and 100C are substantially similar to pliers 100 of FIGS. 1-6 (just with one or two more or one fewer jaw 120, connector link 126 and associated pivot points). Accordingly, locking pliers according to the present disclosure can include any desired number of jaws.

In some situations, workpieces of different shapes and having different cross sections may need to be gripped axially. In some embodiments, tools according to the present disclosure may have one or more jaws connected to the outer body by an adjustable link, such that a user can readily configure the tool for gripping a workpiece of any shape. For example, FIG. 10 shows a locking pliers 100D with four jaws, wherein two of the jaws have adjustable links 127. Each adjustable link 127 comprises a thumbscrew 128 which allows the user to adjust the relative position of the jaw connected thereto.

Figure 11A:
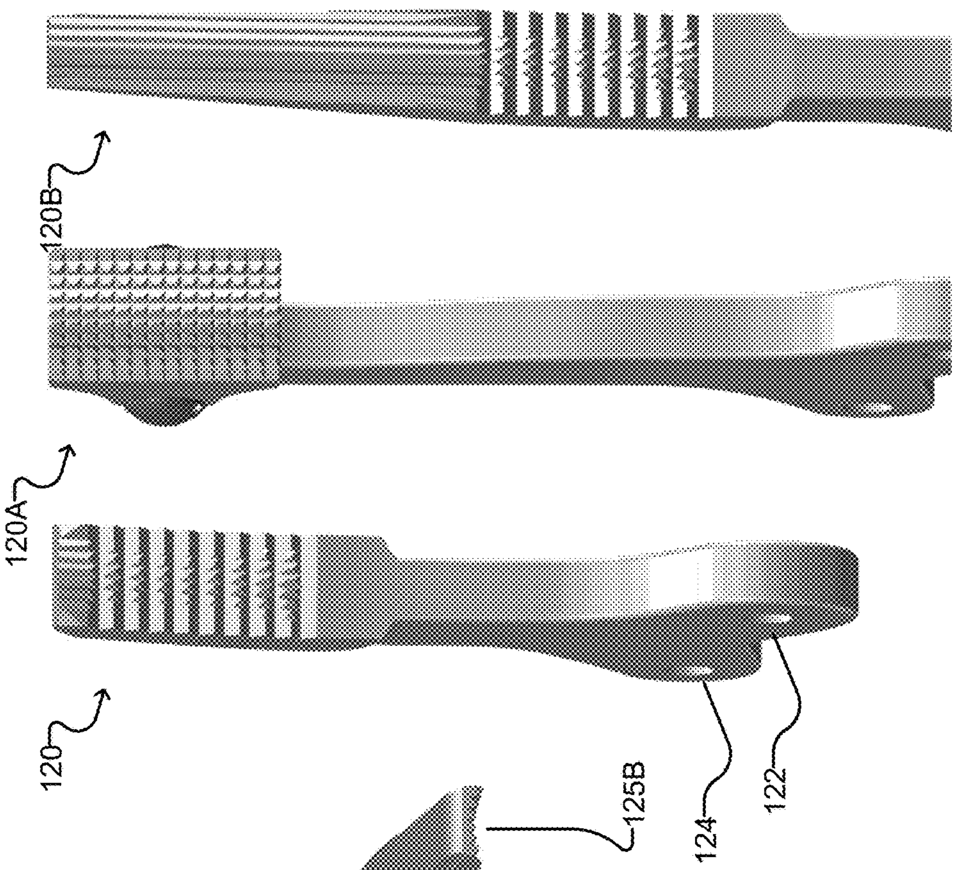
FIG. 11A shows the jaws of FIG. 11 from another angle.
Figure 11:
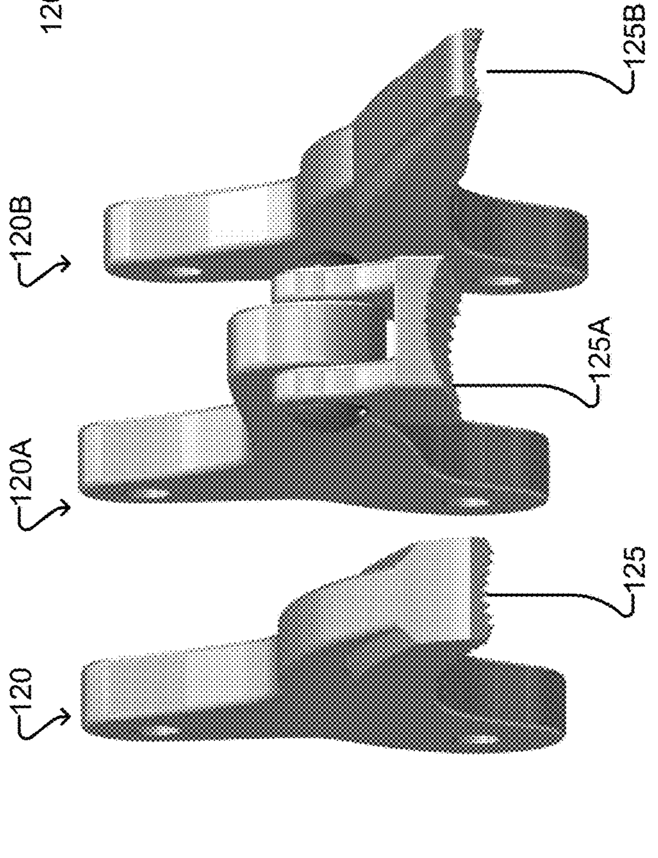
FIG. 11 shows one of the jaws of the locking pliers of FIG. 1 in isolation, as well as a floating jaw and a long-nosed jaw according to other embodiments of the present disclosure.
Figure 11B:
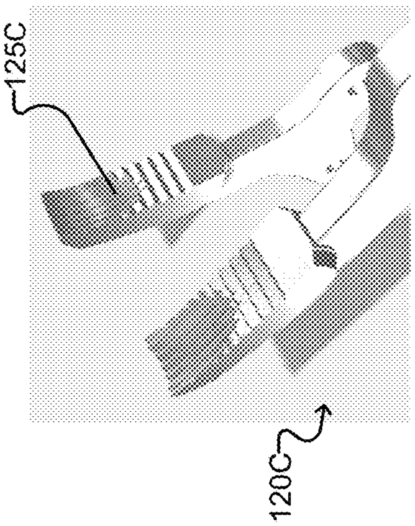
FIG. 11B shows two views from different angles of an example jaw with a compound curved gripping surface according to another embodiment of the present disclosure.

In order to maximize radial clamping forces when gripping axially, some embodiments of the present disclosure comprise specialized jaws configured for gripping workpieces with circular cross-sections. The jaws may also themselves have different configurations, depending on the intended use of the tool. FIG. 11 shows one of the jaws 120 of the locking pliers of FIG. 1 in isolation, as well as a floating jaw 120A and a long-nosed jaw 120B. FIG. 11A shows the jaws 120, 120A and 120B of FIG. 11 from another angle. As best seen in FIG. 11, the jaws 120, 120A and 120B each has a curved and serrated gripping surface 125, 125A, 125B. FIG. 11B shows another example jaw 120C with a "compound-curved" gripping surface 125C. Gripping surface 125C has a flat portion, and a curved portion with a radius of curvature that varies from the tip towards the inner portion of the jaw, which facilitates gripping a wide range of round fastener head bottom circumferences of different diameters directly at the fastener head mounting surface.

Figure 12:
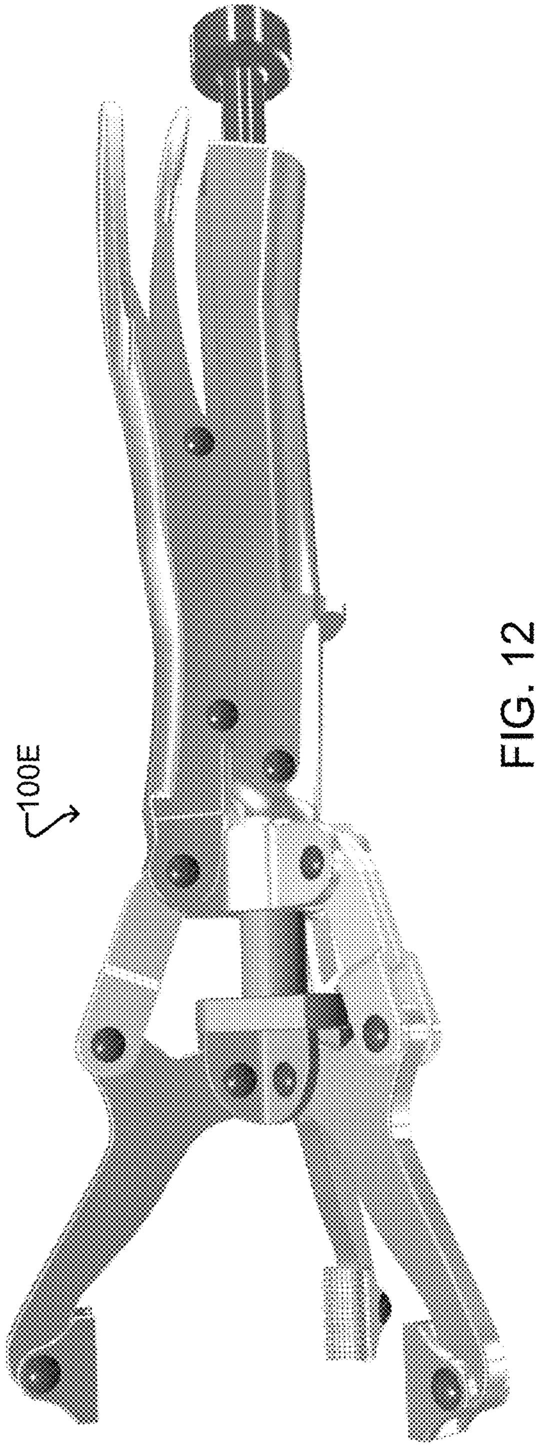
FIG. 12 shows a locking pliers with three floating jaws according to one embodiment of the present disclosure.
Figure 13:
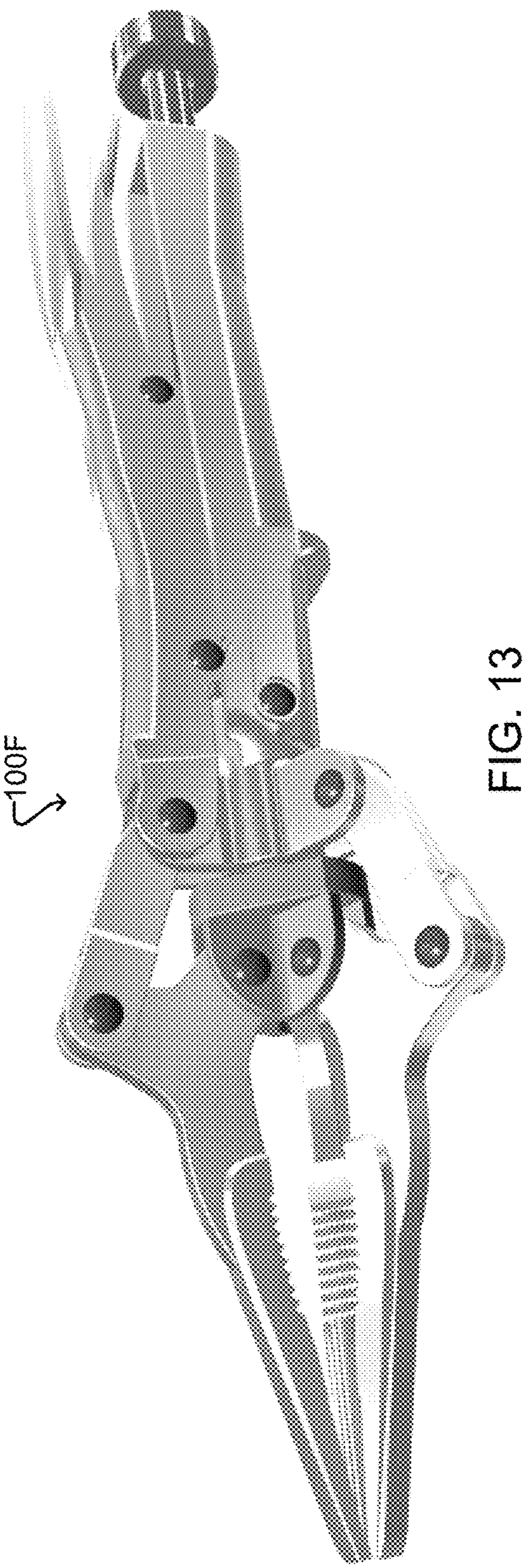
FIG. 13 shows a locking pliers with three long-nosed jaws according to one embodiment of the present disclosure.

As one of skill in the art will appreciate, other types of jaws are also possible. For example, FIG. 12 shows an example locking pliers 100E with three floating jaws, and FIG. 13 shows a locking pliers 100F with three long-nosed jaws. In the locking pliers 100E of FIG. 12, the floating gripping surfaces 125A are pivotally attached to the ends of the jaws 120A, and designed to be self-adjusting and self-aligning to the workpiece radial surface, such that the grip available on the workpiece remains strong regardless of the workpiece dimensions.

In some embodiments, a locking pliers according to the present disclosure may be configured such that a user can switch out one or more of the jaws with a different type or size of jaw. For example, in some embodiments, one or more of the jaws are pivotally connected to the core head and connector links by removable fasteners (such as, for example, shoulder bolts or shoulder screws). For example, with reference to FIG. 1, replacing the rivets used at the core head/inner jaw pivot points 112/122 and outer jaw pivot points 124 with removable fasteners allows a user to reconfigure tool 100 by replacing the jaws 120 with any of jaws 120A, 120B or 120C discussed above (or any of the additional types of jaws discussed below). In some embodiments one or more of the connector links may also be pivotally connected to the corresponding connector link pivot point on the outer body by a removable fastener, such that a user can replace one or more fixed length connector links with an adjustable length connector link.

In some embodiments, a locking pliers according to the present disclosure may be used to hold a work-piece from an inner dimension of a part. Instead of clamping inwards on the outer surface or edge of the workpiece, the pressure is reversed clamping outwards on the inner surface or edges of a workpiece. FIGS. 14, 15A and 15B show a portion of a locking pliers with a locking plate 140 according to one embodiment of the present disclosure, which allows the adjustment screw 108 to be used to provide an outward gripping force on the jaws. When the locking plate 140 is in the unlocked position as shown in FIG. 15A, the screw 108 (and thus the inner body 110) is free to slide longitudinally with respect to the outer body 102 (within the constraints imposed by other components, such as the core slot 115 and/or handle assembly 130), and the spring 106 applies forward force on the inner body 110 to bias the jaws to the open position. However, when the locking plate 140 is moved to the locked position shown in FIG. 15B, the plate 140 engages a groove 142 in the shank of the adjustment screw 108, such that the inner and outer bodies are locked in place with respect to each other, and the adjustment screw can be turned to force the inner body 110 out the first end of the outer body 102, and apply an outward gripping force to the jaws. The spring 106 still applies a biasing force on the inner body 110 (and thus the jaws), but a user can turn the screw 108 (counter-clockwise in the illustrated example) to add additional forward force to the inner body 110 (since the locking plate 140 is engaged by the groove 142 in the shank of screw 108, and the locking plate 140 is held in place against the end wall 103 of the outer body 102), subsequently adding additional outward force on the jaws. The holding force available for outward holding is same as when using the inward holding, third hand feature.

Figure 16:
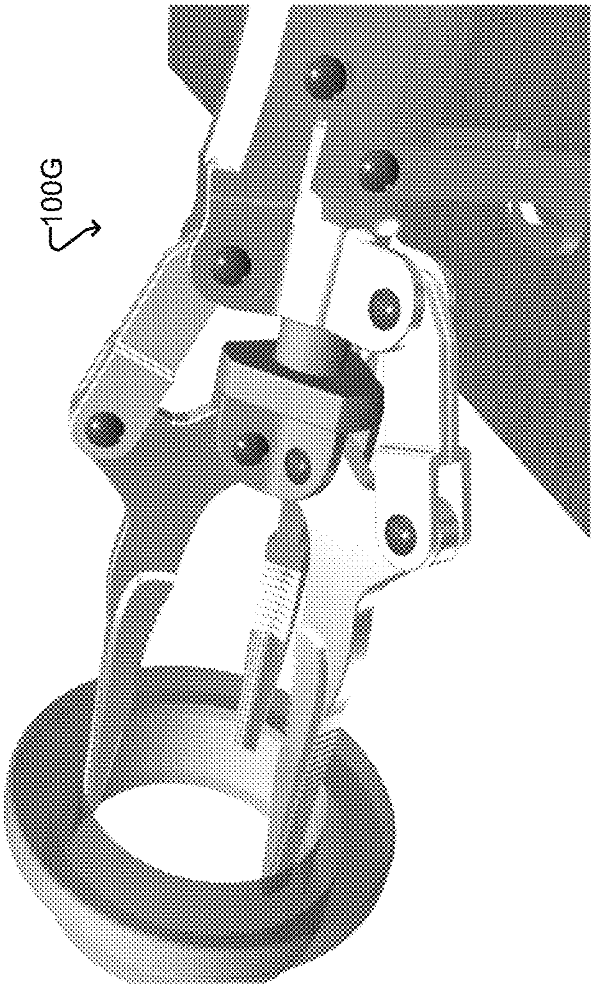
FIG. 16 shows a locking pliers with three jaws configured for outward gripping according to one embodiment of the present disclosure.

When a tool such as the example locking pliers described above is intended to be utilized for outwardly clamping an inner dimension (ID) of a workpiece, the tool may be configured with jaws configured to impart optimal outward holding force to the workpiece. For example, FIG. 16 shows a locking pliers 100G with three jaws configured for outward gripping according to one embodiment of the present disclosure, wherein the jaws are similar to the long-nosed jaws shown in FIG. 13 but with exterior serrations on the jaws. The FIG. 16 embodiment provides a unique bidirectional "third hand" functionality integrated into locking pliers particularly adapted for axial gripping according to the above embodiments of the present disclosure.

Figure 17:
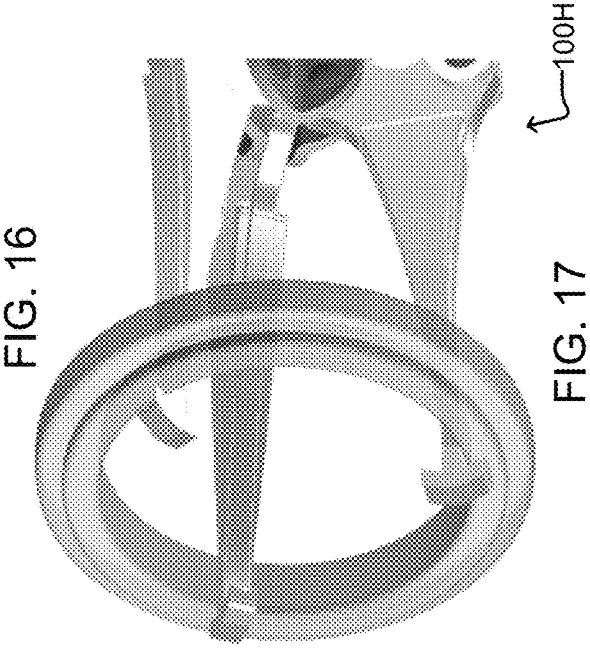
FIG. 17 shows a locking pliers with three jaws configured for inner diameter and outer diameter pulling according to one embodiment of the present disclosure.
Figure 18:
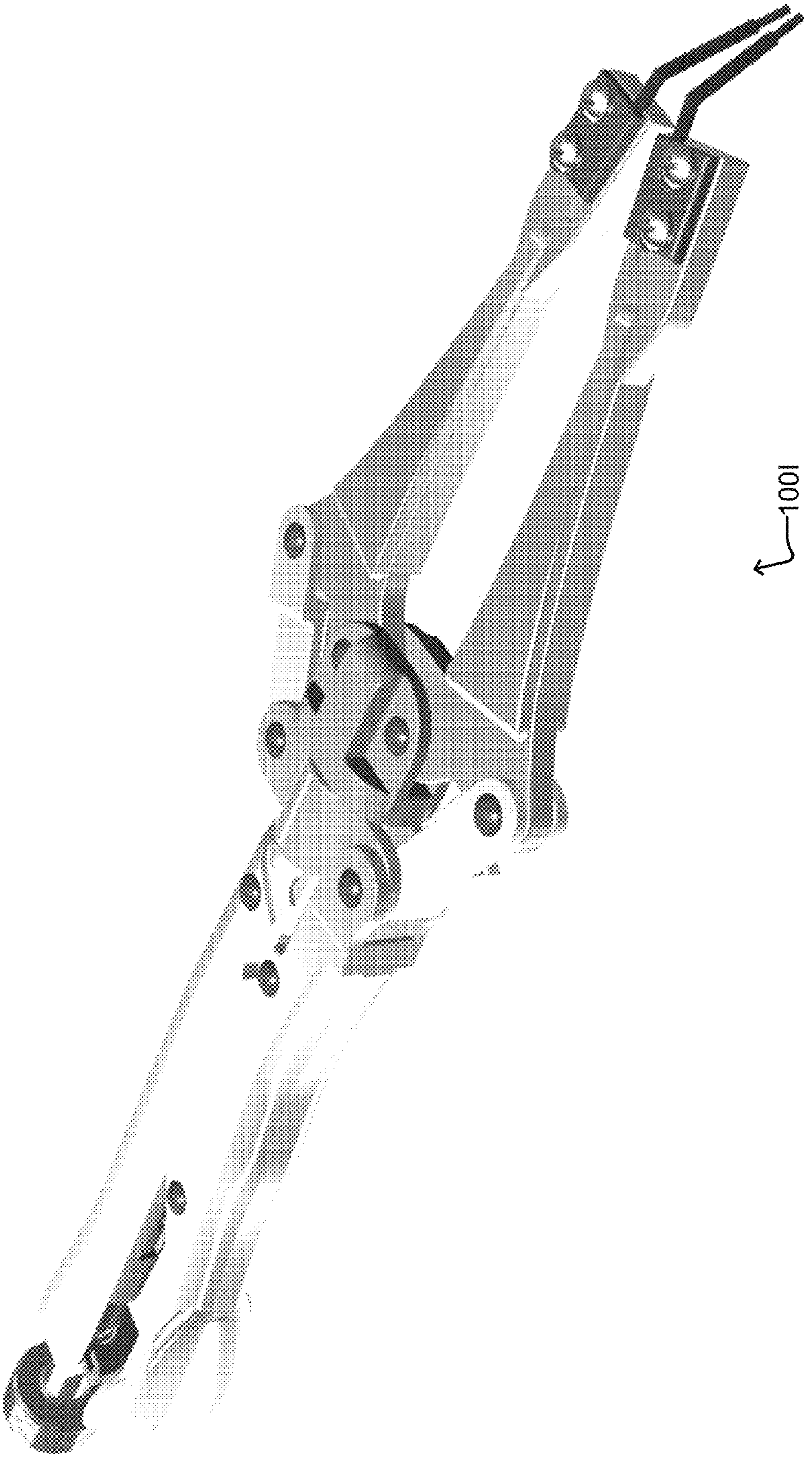
FIG. 18 shows a locking pliers with two “snap ring” jaws according to one embodiment of the present disclosure.

In other embodiments, tools according to the present disclosure may be configured with other types of jaws for other tasks. For example, some embodiments provide a light duty puller tool which may be utilized to remove bearings, seals, bushings, or the like from some sort of housing or shaft. FIG. 17 shows an example locking pliers 100H with three jaws configured for inner diameter and outer diameter pulling according to one embodiment of the present disclosure. FIG. 18 shows a locking pliers 100I with two "snap ring" jaws according to one embodiment of the present disclosure. Other types of jaws configured for other tasks may also be incorporated into locking pliers according to embodiments of the present disclosure.

Figure 19:
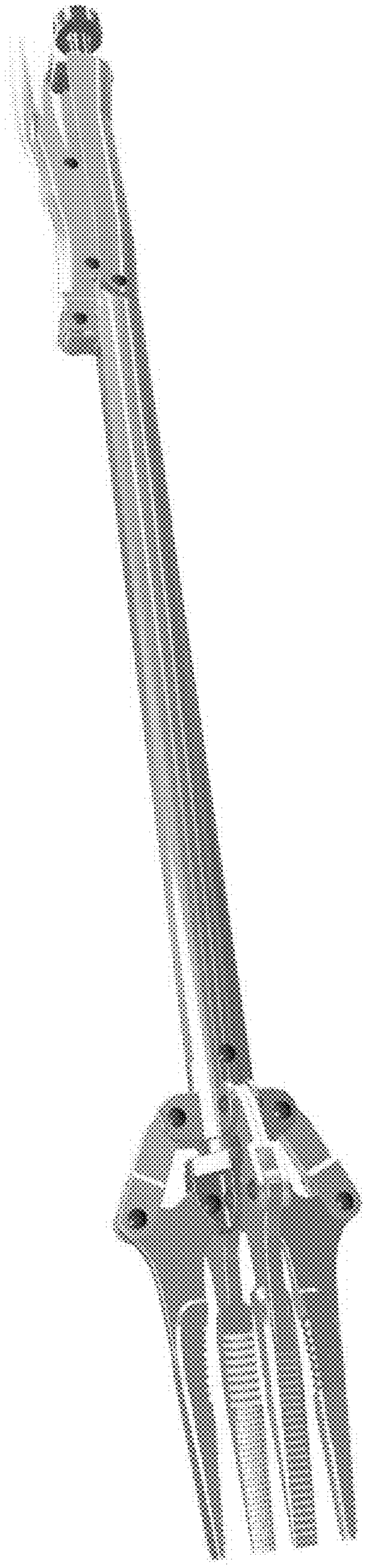
FIG. 19 shows an extended reach locking pliers with four jaws according to one embodiment of the present disclosure.
Figure 20:
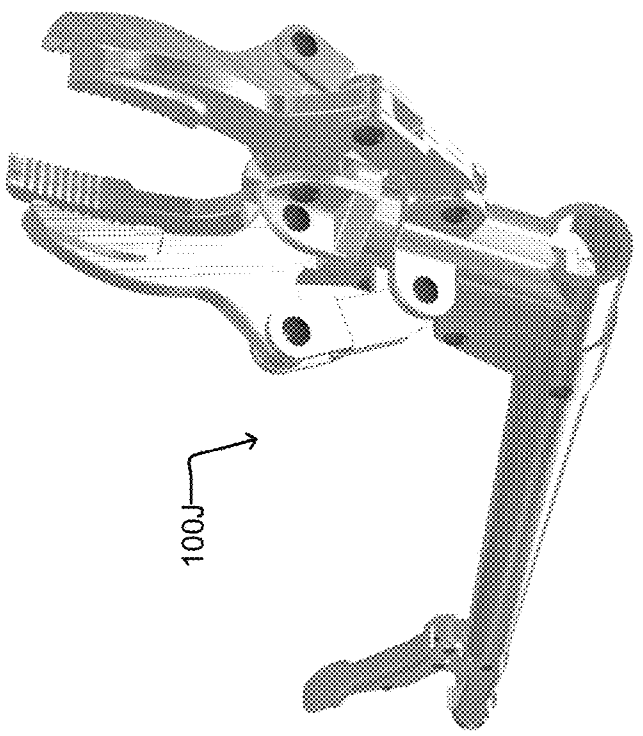
FIG. 20 shows an angled extended reach locking pliers with four jaws according to one embodiment of the present disclosure.
Figure 21:
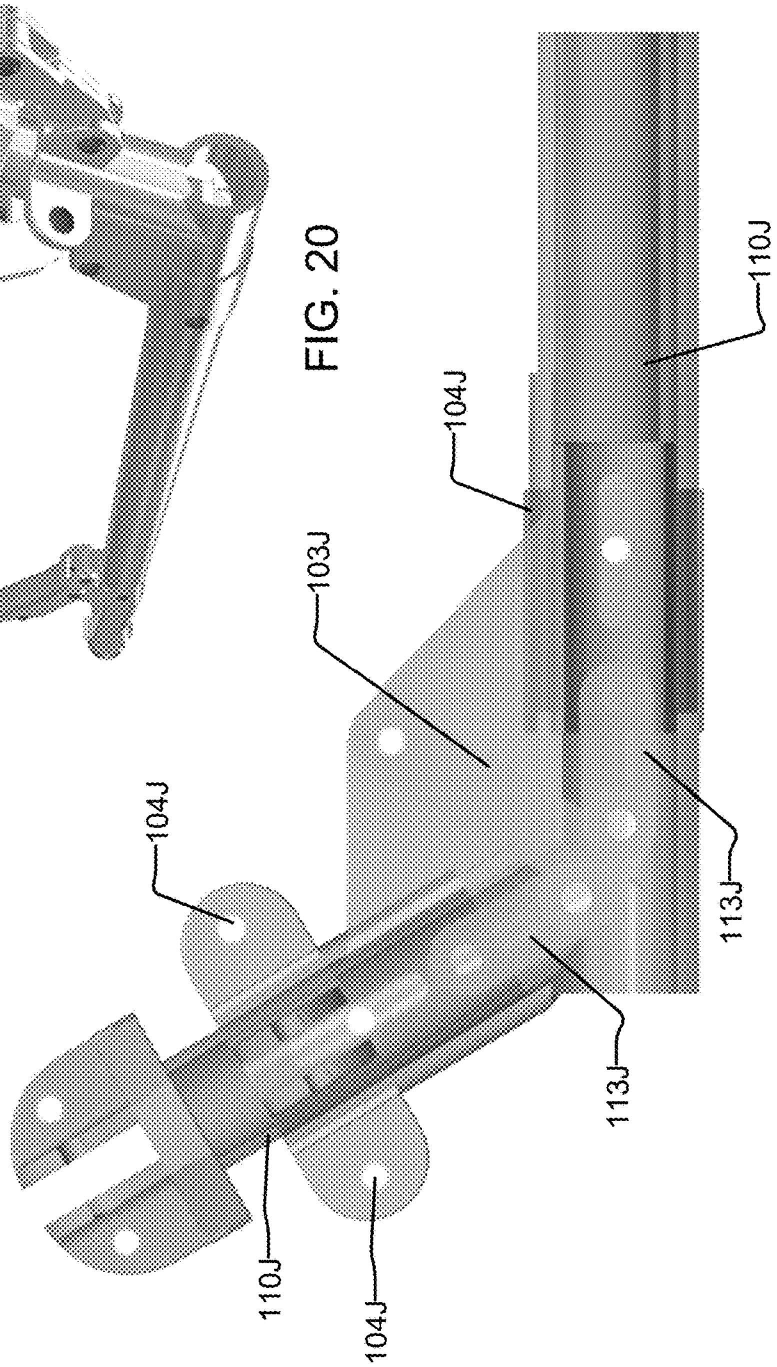
FIG. 21 illustrates the internal components of the angled portion of the angled extended reach locking pliers of FIG. 20.

FIG. 19 shows an extended reach locking pliers 100K with four jaws according to another embodiment of the present disclosure. Pliers 100K of FIG. 19 may be substantially similar to pliers 100 of FIGS. 1-6, except with elongated outer and inner bodies, and long-nosed jaws. FIG. 20 shows an angled extended reach locking pliers 100J with four jaws according to one embodiment of the present disclosure. FIG. 21 illustrates the internal components of the angled portion of the angled extended reach locking pliers of FIG. 20. In the angled extended reach pliers 100J, the outer body comprises a corner portion with an angled linkage 103J pivotally mounted therein, and the inner body 110J is split into two parts, each of which is connected to the angled linkage 103J by an inner body connector link 113J. As one of skill in the art will appreciate, extended reach locking pliers, whether angled or not, may be configured with any number and types of jaws as described above.

Figure 22:
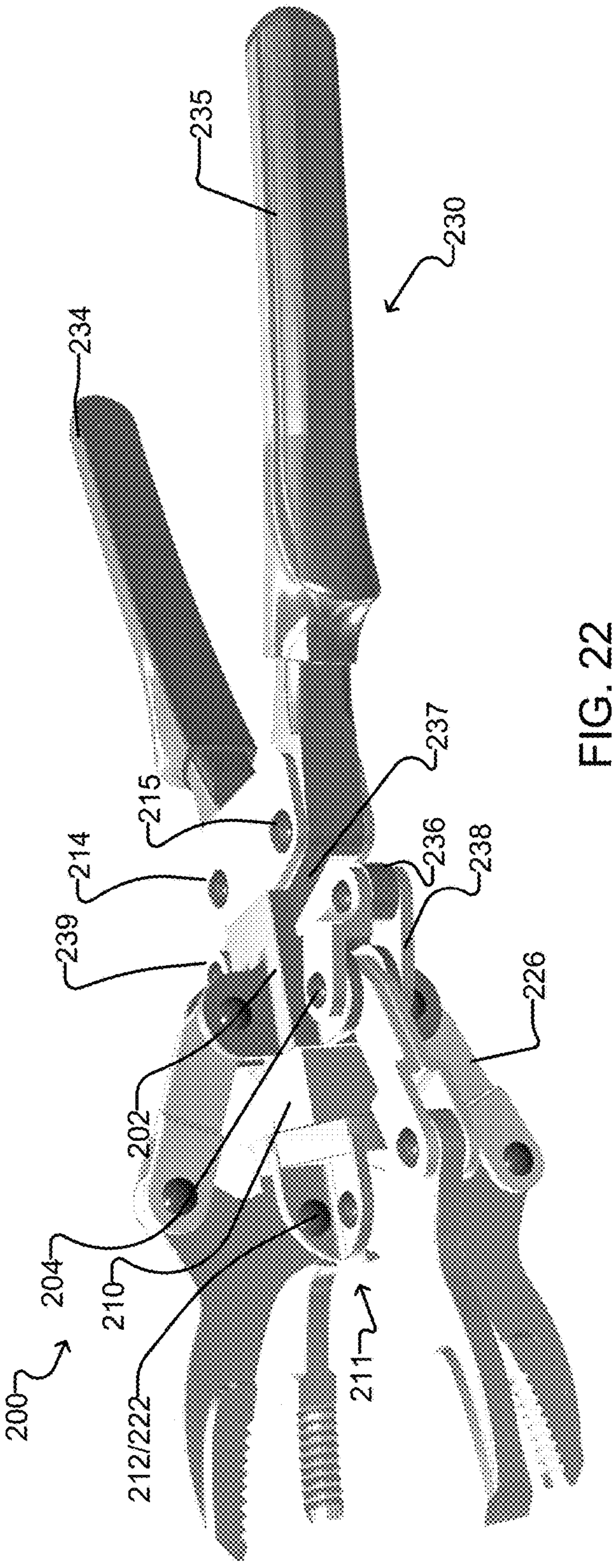
FIG. 22 shows a non-locking pliers with four jaws in an open position according to one embodiment of the present disclosure.
Figure 23:
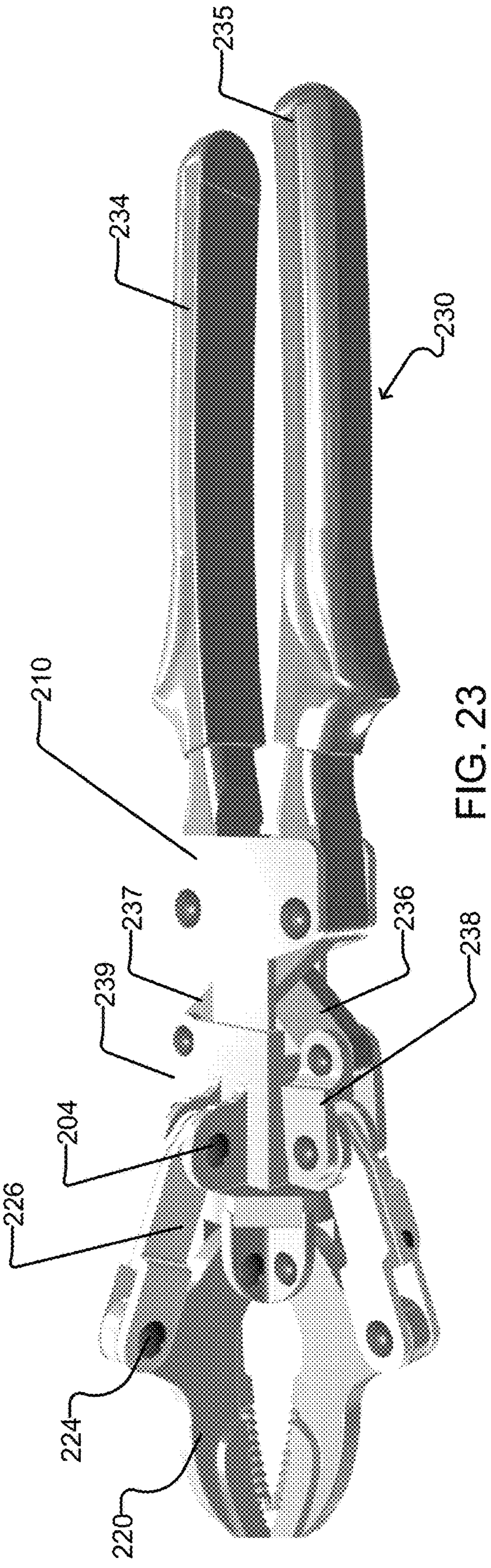
FIG. 23 shows the non-locking pliers of FIG. 22 in a closed position.

FIGS. 22 and 23 show a non-locking pliers 200 with four jaws according to another embodiment of the present disclosure. Pliers 200 comprise an outer body 202 having a plurality of jaw pivot points 204, an inner body 210 slidably received therein having a core head 211 and a plurality of core head pivot points 121, and four jaws 220 and associated connector links 226 substantially similar in operation to corresponding elements of pliers 100 of FIGS. 1-6 in that the inner body 210 moves in and out from the outer body 202 to open and close the jaws 220. However, instead of a locking handle assembly, pliers 200 have a non-locking handle assembly 230 comprising first and second handle members 234 and 235 pivotally connected to the inner body 210 at first and second handle pivot points 214 and 215. The handle members 234 and 235 have angled portions 236 and 237 extending forward from the handle pivot points 214 and 215 in a crossing arrangement. First and second handle connector links 238 and 239 are respectively connected to corresponding handle pivot points on the outer body (which, in the illustrate example are two opposed jaw pivot points 204 of the four-jawed pliers). Moving the first handle member 234 towards the second handle 235 member moves the core head 211 toward the outer body 202, thus closing the jaws 220. From the user's perspective, the inner body 210 and the core head 211 are "stationary", as the handle members 234 and 235 are pivotally connected to the inner body 210. When the handles 234 and 235 are squeezed together, the outer body 202 (which may be in the form of a sliding collar in some embodiments) slides forward over the inner body 210 thereby operating the links and closing the jaws.

Figure 24:
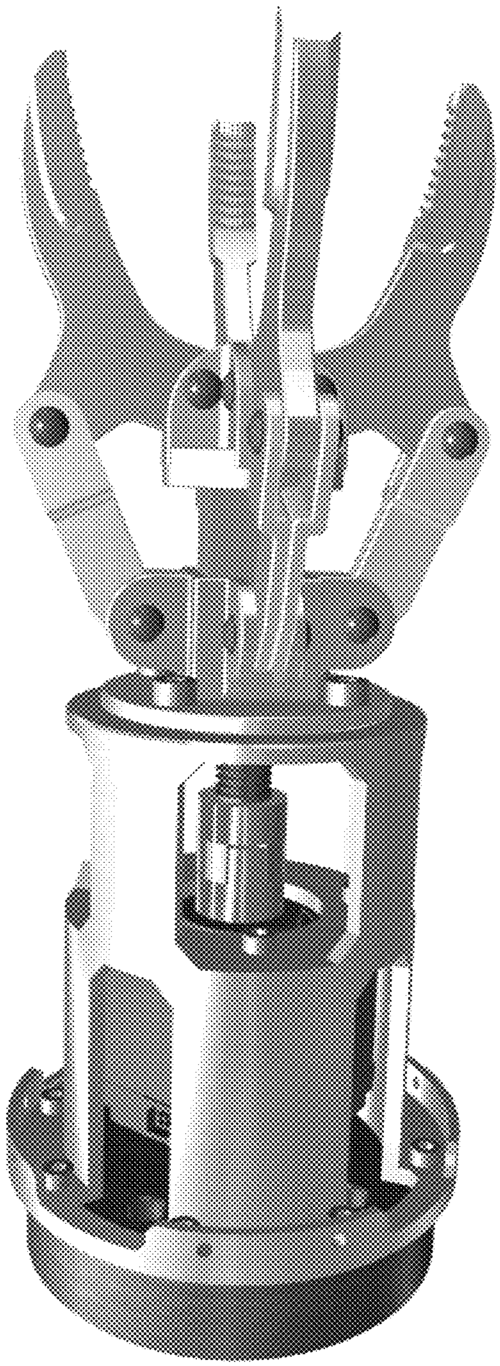
FIG. 24 shows a robotic end effector with four jaws according to one embodiment of the present disclosure.
Figure 25:
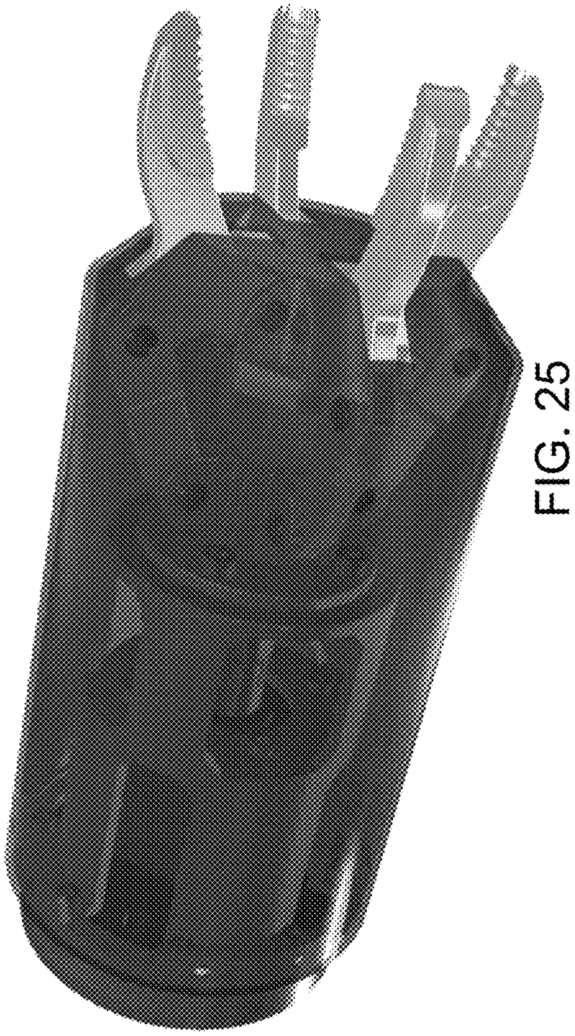
FIG. 25 shows the end effector of FIG. 24 with a cover installed thereon.

The jaw opening and closing mechanism disclosed herein may also be incorporated into other tools. For example, FIG. 24 shows a robotic end effector with four jaws according to one embodiment of the present disclosure, and FIG. 25 shows the end effector of FIG. 24 with a cover installed thereon. In the illustrated example, the robotic end effector comprises a UR5 robot wrist mount with a stepper motor driving a small ball screw/nut assembly. The ball nut is attached to the inner body which in this case is square (as in the non-locking pliers example) as opposed to being round in the locking plier examples. The linear inner body travel is controlled by the stepper motor and ball screw assembly then actuates the coordinated jaw movements as in other embodiments. Many stepper motor driver circuits and/or IC's already have motor current sensing and limiting systems integrated in them. These are normally used to protect both the motor and driver. Leveraging this existing current control provides the ability to program the amount of force the jaws can impart on the item being manipulated.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various example embodiments described herein.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As will be apparent to those skilled in the art in light of the foregoing disclosure, many alterations and modifications are possible to the methods and systems described herein. While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as may reasonably be inferred by one skilled in the art. The scope of the claims should not be limited by the embodiments set forth in the examples, but should be given the broadest interpretation consistent with the foregoing disclosure.

The present disclosure may be embodied in other specific forms without departing from its spirit or essential characteristics. The described embodiments are to be considered in all respects only as illustrative and not restrictive.

The invention claimed is:

1. A tool comprising:

an outer body with a first end and a second end, the outer body defining a longitudinal recess therein and having at least two connector link pivot points at the first end thereof;

an inner body slidably received within the longitudinal recess of the outer body and having a core head extending out of the first end of the outer body, the core head having at least three core head pivot points thereon, wherein each core head pivot point is at a different position on the core head;

at least three jaws, each jaw having an inner pivot point and an outer pivot point, wherein the inner pivot point of each jaw is directly pivotally connected to a corresponding one of the core head pivot point;

a connector link for each jaw, each connector link having a first end pivotally connected to the outer pivot point of the jaw and a second end pivotally connected to a corresponding connector link pivot point on the first end of the outer body; and an actuating assembly for moving the inner body relative to the outer body, whereby movement of the core head toward the outer body causes the jaws to move toward each other, and movement of the core head away from the outer body causes the jaws to move away from each other.

2. The tool of claim 1 further comprising:

a compression spring placed within the longitudinal enclosure between the inner body and the second end of the outer body; and an adjustment screw threadedly received the inner body and extending out from the second end of the outer body;

and wherein the actuating assembly comprises a handle assembly comprising a lever arm and a lock bar, each having a first end and a second end, wherein the lever arm has an intermediate pivot point between the first end and the second end thereof, with the first end of the lever arm connected to a handle pivot point on the outer body, the first end of the lock bar connected to the intermediate pivot point on the lever arm, and the second end of the lock bar configured to be received within a longitudinal slot in the inner body to engage a first end of the adjustment screw, whereby movement of the second end of the lever arm toward the second end of the outer body causes the core head to move toward the outer body and the jaws to move toward each other, and movement of the second end of the lever arm away from the second end of the outer body causes the core head to move away from the outer body and the jaws to move away from each other.

3. The tool of claim 1 wherein the actuating assembly comprises a robotic actuator.

4. The tool of claim 1 wherein all of the jaws are pivotally connected to the core head and connector links by rivets.

5. The tool of claim 1 wherein at least three of the jaws are pivotally connected to the core head and connector links by removable fasteners.

6. The tool of claim 1 wherein at least one of the connector links comprises an adjustable length link.

7. The tool of claim 1 wherein the at least three jaws comprise four jaws.

8. The tool of claim 1 wherein the at least three jaws comprise five or more jaws.

* * * * *